United States Patent
Moriyama et al.

(10) Patent No.: US 8,218,857 B2
(45) Date of Patent: Jul. 10, 2012

(54) COLOR-CODED TARGET, COLOR CODE EXTRACTING DEVICE, AND THREE-DIMENSIONAL MEASURING SYSTEM

(75) Inventors: Takuya Moriyama, Tokyo (JP); Nobuo Kochi, Tokyo (JP)

(73) Assignee: Topcon Corporation, Tokyo (JP)

( * ) Notice: Subject to any disclaimer, the term of this patent is extended or adjusted under 35 U.S.C. 154(b) by 868 days.

(21) Appl. No.: 12/327,998

(22) Filed: Dec. 4, 2008

(65) Prior Publication Data

US 2009/0148037 A1 Jun. 11, 2009

(30) Foreign Application Priority Data

Dec. 5, 2007 (JP) ................. 2007-315257

(51) Int. Cl.
*G06K 9/00* (2006.01)
*G06K 9/34* (2006.01)
(52) U.S. Cl. ...................... 382/154; 382/167
(58) Field of Classification Search .......... 382/106, 382/154, 162, 164, 165, 167; 345/589–591, 345/600–604, 765; 235/462.01, 462.09, 235/494; 358/515, 518, 520, 530
See application file for complete search history.

(56) References Cited

U.S. PATENT DOCUMENTS

| | | | | |
|---|---|---|---|---|
| 3,723,637 A * | 3/1973 | Fujio et al. | ..... | 348/481 |
| 4,989,983 A * | 2/1991 | Terada et al. | ..... | 356/423 |
| 6,384,907 B1 | 5/2002 | Gooch | | |
| 6,556,793 B2 * | 4/2003 | Nakamura | ..... | 399/15 |
| 6,742,708 B2 * | 6/2004 | Shaked et al. | ..... | 235/462.01 |
| 7,032,823 B2 * | 4/2006 | Nojiri | ..... | 235/462.09 |
| 7,437,226 B2 | 10/2008 | Roh et al. | | |
| 7,664,341 B2 | 2/2010 | Takemoto et al. | | |
| 2003/0052921 A1 * | 3/2003 | Ulrich et al. | ..... | 345/765 |
| 2004/0182930 A1 | 9/2004 | Nojiri | | |
| 2005/0068544 A1 | 3/2005 | Doemens et al. | | |
| 2005/0228555 A1 | 10/2005 | Roh et al. | | |
| 2006/0097062 A1 | 5/2006 | Cheong et al. | | |
| 2006/0167648 A1 | 7/2006 | Ohtani | | |
| 2007/0058860 A1 * | 3/2007 | Harville et al. | ..... | 382/167 |
| 2007/0064246 A1 | 3/2007 | Braunecker et al. | | |
| 2007/0065004 A1 * | 3/2007 | Kochi et al. | ..... | 382/162 |

(Continued)

FOREIGN PATENT DOCUMENTS

DE 195 02 459 A1 8/1996

(Continued)

OTHER PUBLICATIONS

N. Kochi, U.S. PTO Office Action, U.S. Appl. No. 12/871,057, dated Oct. 24, 2011, 12 pages.

(Continued)

*Primary Examiner* — Amir Alavi
(74) *Attorney, Agent, or Firm* — Foley & Lardner LLP

(57) ABSTRACT

To provide a color-coded target having a color code of colors chosen not to cause code reading errors and technique for automatically detecting and processing the targets. The color-coded target CT1 of this invention includes, on its surface: a position detecting pattern P1 indicating a position to be measured; a reference color pattern P2 having a plurality of unit areas tinted in different colors for use as color references; and a color code pattern P3 having a plurality of unit areas tinted in different colors for discriminating the targets. The colors of the color code pattern P3 are chosen so that adjacent colors in the HSI color space are different in at least one of hue, saturation, and intensity by a specified value or greater.

10 Claims, 32 Drawing Sheets

U.S. PATENT DOCUMENTS

| | | | |
|---|---|---|---|
| 2007/0071314 A1* | 3/2007 | Bhatti et al. | 382/162 |
| 2007/0091174 A1* | 4/2007 | Kochi et al. | 348/135 |
| 2009/0099716 A1 | 4/2009 | Roh et al. | |
| 2009/0148037 A1* | 6/2009 | Moriyama et al. | 382/154 |
| 2010/0322482 A1* | 12/2010 | Kochi et al. | 382/106 |

FOREIGN PATENT DOCUMENTS

| | | |
|---|---|---|
| DE | 102 41 752 A1 | 3/2004 |
| EP | 1 443 452 A2 | 8/2004 |
| JP | 11-201752 A | 7/1999 |
| JP | 2001-159519 A | 6/2001 |
| JP | 2001-194146 A | 7/2001 |
| JP | 2003-504610 A | 2/2003 |
| JP | 2003-284098 A | 10/2003 |
| JP | 2004-220510 A | 8/2004 |
| JP | 2005-070043 A | 3/2005 |
| JP | 2005-140547 A | 6/2005 |
| JP | 2005-140550 A | 6/2005 |
| JP | 2005-174151 A | 6/2005 |
| JP | 2007-64627 A | 3/2007 |
| JP | 2007-101277 A | 4/2007 |
| WO | WO 02/23126 A1 | 3/2002 |
| WO | WO 2005/017644 A2 | 2/2005 |

OTHER PUBLICATIONS

N. Kochi, U.S. PTO Office Action, U.S. Appl. No. 12/871,057, dated Apr. 13, 2011, 18 pages.

* cited by examiner

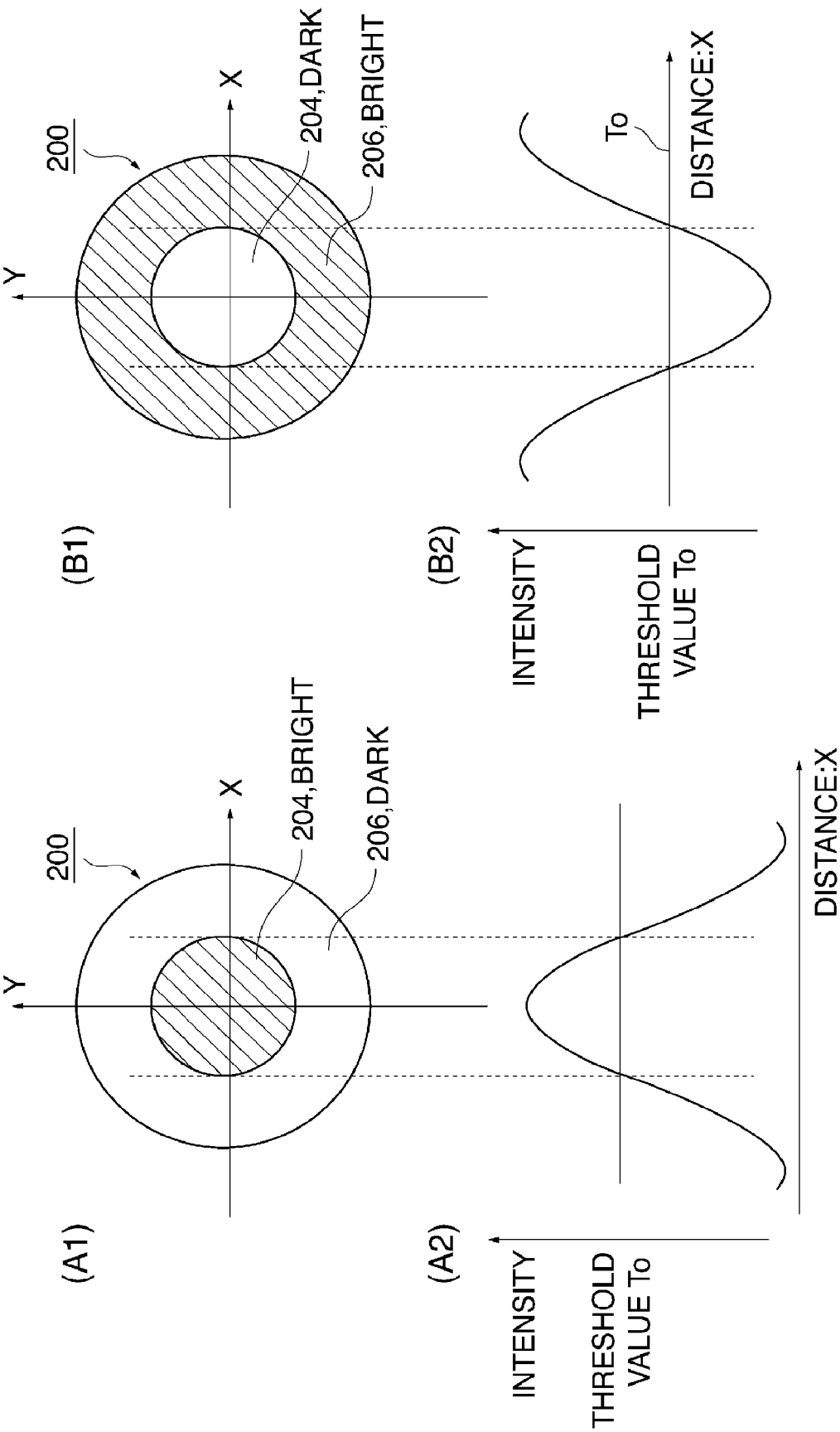

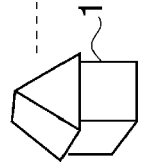
FIG.31

COLOR-CODED TARGET, COLOR CODE EXTRACTING DEVICE, AND THREE-DIMENSIONAL MEASURING SYSTEM

BACKGROUND OF THE INVENTION

1. Technical Field

This invention relates to a color-coded target, a color code extracting device, and a three-dimensional measuring system. More specifically, this invention relates to a color-coded target having codes with the colors thereof chosen so as not to cause code reading errors, a color code extracting device for automatically detecting the codes, and a three-dimensional measuring system for measuring three-dimensional coordinates using the color code extracting device.

2. Related Art

The three-dimensional image measurement is a method of determining three-dimensional coordinates of an object to be measured using images taken from different directions. In such a method, an identification work is required to determine the same position in a number of images taken from different directions. When the number of images taken increases, there arises a problem that the amount of manual identification work becomes great and the work takes much time. Therefore, the inventors have developed a color-coded target and a technique for automatically detecting and processing the target with an intention of automating the conventional manual work and improving the efficiency of identification process in measuring three-dimensional images. (Refer to Patent Documents 1 and 2.)

The color-coded target is a code target, for example a rectangular sheet, with retro-targets at its three corners for discriminating a code by the combination of color disposition in the color code area. Employing code targets using colors makes it possible to increase the number of codes by increasing the number of colors. In the process of detecting the color-coded target, first the retro-targets at three corners are detected and a color-coded target area is determined. Next, the color of the color-coded area is extracted and the extracted color is processed to be converted into a code value. Finally, a label using the conversion-processed code value related to the position detected with the retro-target is affixed to the color-coded target. This has made it possible to automate the identification work and the work has been greatly improved in efficiency. In particular, the work efficiency has been remarkably improved in three-dimensional measurement of objects with a large number of points to be measured.

[Patent Document 1] JP-A-2007-64627 (paragraphs 0025-0145, FIGS. 1-24)

[Patent Document 2] JP-A-2007-101277 (paragraphs 0024-0074, FIGS. 1-20)

However, a problem has been left unsolved on how to choose the color of the color-coded target. If a color code is read incorrectly and as a result a wrong position is determined to be an identical position for the target position, a great amount of time is required to find out the incorrectly determined position and correct it. Therefore, it is important to choose colors so as not to cause such an error.

The object of this invention is to provide a color-coded target with a color code of colors chosen not to cause code reading errors, and a technique for automatically detecting and processing the color-coded target.

SUMMARY OF THE INVENTION

To solve the above problem, a color-coded target CT1 of Aspect (1) of the present invention comprises as shown in FIG. 1 for example: on a surface thereof, a position detecting pattern P1 for indicating a position to be measured; a reference color pattern P2 having a plurality of unit areas tinted in different colors for use as color references; and a color code pattern P3 having a plurality of unit areas tinted in different colors for discriminating the target, wherein the different colors of the color code pattern P3 are chosen so that adjacent colors in the HSI color space are different in at least one of hue, saturation, and intensity by a specified value or greater.

Here, the target represents typically a target for three-dimensional measurement. However, the target is not limited to that but includes targets for discriminating commodities, cargo, samples, etc. The HSI space is to express a color using a coordinate (HSI) system using hue (H), saturation (S), and intensity (I) as variables. The coordinate system is typically cylindrical, with the circumferential direction representing hue (H); the radial direction, saturation (S); and the height direction, intensity (I). With such a constitution, as one color is different from an adjacent color by a certain value equal to or more than the specific value, the adjacent colors are easy to discriminate each other. Thus, it is possible to provide a color-coded target having a color code of colors chosen less likely to cause incorrect reading of the code.

The color-coded target CT of Aspect (2) of the present invention, in Aspect (1), the colors of the color code pattern P3 are changed in at least one of hue, saturation, and intensity as a variable; and when hue is a variable, the specified value is expressed by difference in hue, when saturation is a variable, the specified value is expressed by difference in saturation, and when intensity is a variable, the specified value is expressed by difference in intensity.

Here, while the color of the color code pattern P3 may be changed by changing one of hue, saturation, and intensity as a variable, it may also be changed by changing any two of them, or the three. The term 'a specified value' means a value that permits easy discrimination between adjacent colors. Specifically, it depends on the resolution of color detection: For example, as to hue (when expressed in 0-360 degrees), the value is preferably 5 degrees or more (72 or less in the number of hues), more preferably 10 degrees or more (36 or less in the number of hues), and most preferably 20 degrees or more (18 or less in the number of hues), which corresponds to a 5×5 pattern of color-coded targets CT. As to saturation (when expressed in a range of 0-1), the value is preferably 0.2 or more (5 or less in the number of saturations), more preferably 0.33 or more (3 or less in the number of saturations). As to intensity (when expressed in a range of 0-255), the value is preferably 16 or more (16 or less in the number of intensities), more preferably 32 or more (8 or less in the number of intensities), and further preferably 64 or more (4 or less in the number of intensities).

The color-coded target CT1 of Aspect (3) of the present invention, in Aspect (1), comprises as shown in FIG. 1 for example: the colors of the reference color pattern P2 are chosen so that adjacent colors in the HSI color space are different by a nearly even difference in hue, the colors of the color-code pattern P3 include the colors of the reference color pattern P2 and adjacent colors in the HSI color space are different by a nearly even difference in hue.

Here, choosing that the hue difference is nearly even is intended to permit clear discrimination of hues without errors. Therefore, with n assumed to be the number of colors, intervals between adjacent hues are preferably 360°/n (in this way the minimum interval is made as great as possible). The term 'nearly even' or the range of difference is meant preferably to be ±360°/3n, more preferably ±360°/6n, and further preferably ±360°/12n. As such a constitution permits maximum setting of the hue difference between adjacent hues with the same number of color codes, incorrect code reading becomes less likely to occur.

The color-coded target of Aspect (4) of the present invention is a color-coded target of Aspect (1), as shown in FIG. 24 for example: wherein, a quasi HSI color space is formed removing part of hues in the HSI color space, the colors of the reference color pattern P2 are chosen so that adjacent colors in the quasi HSI color space are different by a nearly even difference in hue, the colors of the color code pattern P3 include the colors of the reference color pattern P2, and adjacent colors in the quasi HSI color space are different by a nearly even difference in hue.

Here, as part of the hues, for example blue-based and purple-based hues of low intensities are excluded. As parts of low intensities are low in the amount of detected light, they tend to cause errors in code reading compared with other parts. It is also possible to make code reading error less likely to occur by removing hues in parts where standard deviation of hues is great. It is also possible to make clear the difference between adjacent colors of color code by removing a part of the hues between adjacent colors of color-code. As the above constitution makes up a color code pattern by removing some hues that are relatively likely to cause code reading errors, or as it makes clear difference between adjacent hues, code reading errors may be reduced.

The color-coded target CT1 of Aspect (5) is a color-coded target in any one of Aspects (1) to (4), as shown in FIG. 1 for example: wherein the color code pattern P3 has unit areas, the unit areas being equal each other in area and a number of the unit areas being same as a number of the chosen colors, and all the unit areas are different in color.

As the above constitution attaches a condition that the number of unit areas of the color code pattern P3 be the same as the number of chosen colors (number of colors used for the codes), all the colors of color code are used for the color code pattern P3. Therefore, it is possible to determine discriminating code and to improve reliability by relative comparison of colors between unit areas. As the above constitution also attaches a condition that every unit area be the same in area, the area occupied by each color is the same for all the color-coded targets CT1 having different discriminating codes. Therefore, it becomes easy to detect color-coded targets CT1 from images.

The color-coded target CT of Aspect (6) is a color-coded target in one of Aspects (1) to (5), wherein the reference color pattern P2 is configured with one or more colors, the colors of the color code pattern P3 are configured with three or more colors including the colors of the reference color pattern P2.

With the above constitution, as the reference color pattern P2 has at least one color, it is possible to cope with color divergence (deviation) and to reduce code discrimination errors. Further, as the color code pattern P3 has three or more colors, even if a condition is attached that the colors of all the unit areas of the color code pattern P3 be different, it is possible to produce $3^3=27$ or more codes, which is practical.

The color-coded target CT1 of Aspect (7) is a color-coded target in any one of Aspects (1) to (6), as shown in FIG. 1 for example: wherein a retro-reflective retro-target is used in the position detecting pattern P1.

As the above constitution increases the amount of detected light from the position detecting pattern, detection of position of the color-coded target CT1 becomes easy.

The color-coded target CT of Aspect (8) is a color-coded target in any one of Aspects (1) to (7), wherein the color-coded target CT is formed as a sheet in quadrilateral shape; on a top surface of the sheet, the position detecting pattern P1 is disposed, and the reference color pattern P2 and the color code pattern P3 are printed; and on a back surface of the sheet, adhesive is applied or a magnetic sheet is provided.

Here, in the case the magnetic sheet is provided, the backside may be the magnetic sheet. On the surface of the magnetic sheet itself, a position detecting pattern P1 may be disposed, with a reference color pattern P2 and a color code pattern P3 printed, or part of the backside may be provided with a magnetic sheet. The above constitution makes it easy to apply the color-coded target CT on the measured object and to improve the efficiency of disposing targets. Incidentally, the symbol CT is used generally for the color-coded target, when no specific color-coded target is specified.

To solve the above problem, a color code extracting device 100 of Aspect (9) of the present invention comprises as shown in FIG. 4 for example: an HSI converting section 30 for acquiring HSI image data by converting colors of photographed images or wavelengths of light reflected from various parts of a measured object into colors in the HSI color space; an extracting section 41 for extracting color code pattern P3 and position detecting pattern P1 of the color-coded target CT from the photographed images or the HSI image data; and a discriminating code determining section 46 for determining, from the color code pattern P3 of the color-coded target CT extracted with the extracting section 41, discriminating code of the color-coded target CT using hues in the HSI color space.

Here, the process of converting to colors in the HSI color space is typically a process of converting the colors of photographed images from the RGB color space, in which a CCD camera or the like takes the image, into the Munsell color system (HSI color space), a system approximating the human sense. However, the process may include, for example, to receive light reflected from each part of a measured object and detect the wavelength of the light, and to convert the wavelength (including wavelength spectrum) into the HSI color space. It is also possible to convert into colors of the HSI color space and then extract a color code pattern, etc. from the HSI image data. It is also possible to extract a color code pattern, etc. from photographed images and then convert them into colors of the HSI color space. As the above constitution uses the HSI color space that facilitates image processing in color code discrimination, it is possible to provide an automatic detection process technique, which is less likely to cause color code reading errors.

To solve the above problem, a three-dimensional measuring system 500 of Aspect (10) of the present invention comprises as shown in FIG. 8 for example: the color code extracting device 100 in Aspect (9); an image photographing device 10 for taking images of the measured object 1 from at least two directions so as to include the color-coded target CT having, on a surface thereof, a position detecting pattern P1 for indicating a position to be measured and a color code pattern P3 for discriminating the color-coded target; and a three-dimensional measuring section 50 for measuring three-dimensional coordinates of a surface of the measured object 1 based on a discriminating code and position coordinates of the color-coded target extracted with the color code extracting device 100; wherein the taken images are expressed with colors in an RGB color space, and the HSI converting section 30 converts colors of the taken images from colors in the RGB color space into colors in the HSI color space.

Here, the images taken in at least two directions may be images taken with a stereo-camera from at least one position, or may be taken in at least two directions by moving a single camera. As the above constitution uses the automatic detection process technique that is less likely to cause color code reading errors, it is possible to provide a highly reliable three-dimensional measuring system. Further, measurement of the three-dimensional shape may be made for all or part of the surface shape of the measured object 1. Discriminating and using the code of the color-coded target CT makes it possible to automate the identification work and provide a three-dimensional measuring system that can automate steps from photographing to three-dimensional measurement.

This invention makes it possible to provide a color-coded target having a code of colors chosen to minimize code reading errors and to provide a technique for automatically detecting and processing the target.

BRIEF DESCRIPTION OF DRAWINGS

FIGS. 6A and 6B are drawings for explaining the detection of center of gravity using a retro-target.

FIG. 31 is a block diagram of an example of an overall constitution of a three-dimensional measuring system of the 14th Embodiment.

DETAILED DESCRIPTION OF THE PREFERRED EMBODIMENT

The basic Japanese Patent Application No. 2007-315257 filed on Dec. 5, 2007 is hereby incorporated in its entirety by reference into the present application.

The present invention will become more fully understood from the detailed description given hereinbelow. The other applicable fields will become apparent with reference to the detailed description given hereinbelow. However, the detailed description and the specific embodiment are illustrated of desired embodiments of the present invention and are described only for the purpose of explanation. Various changes and modifications will be apparent to those ordinary skilled in the art on the basis of the detailed description.

The applicant has no intention to dedicate to public any disclosed embodiments. Among the disclosed changes and modifications, those which may not literally fall within the scope of the present claims constitute, therefore, a part of the present invention in the sense of doctrine of equivalents.

Embodiments of the present invention will be hereinafter described in reference to the appended drawings. An example is described here in which the color-coded target is used for three-dimensional measurement.

[Color-Coded Target]

Figure 1:
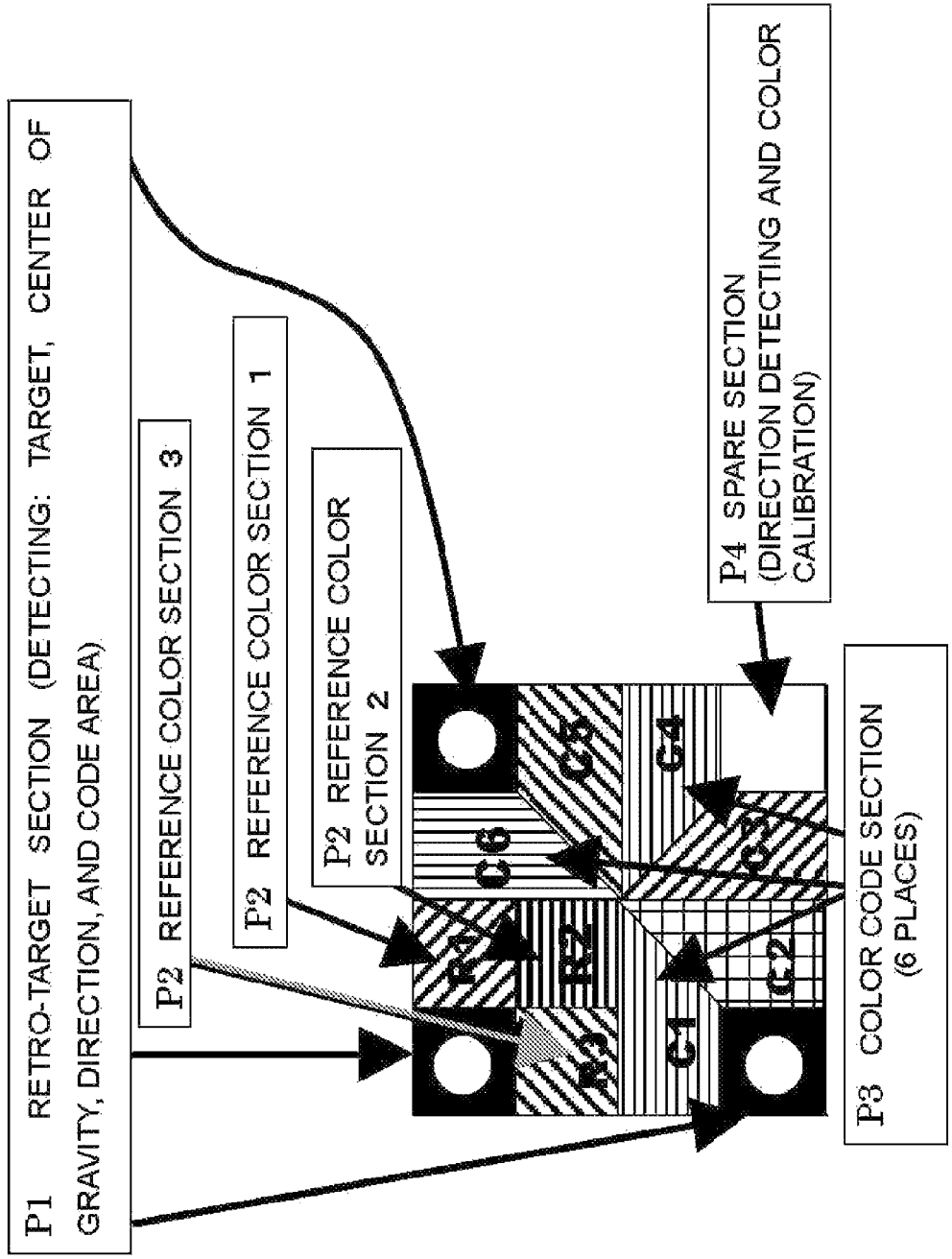
FIG. 1 shows an example of a color-coded target as the first embodiment of the invention.

FIG. 1 shows an example of color-coded target of the first embodiment. The color-coded target shown in FIG. 1 is square as a whole, and unit areas C1-C6 in a color code section are color-coded targets. The color-coded target CT1 shown in FIG. 1 is configured with: a position detecting pattern (retro-target section) P1; a reference color pattern (reference color section) P2; a color code pattern (color code section) P3; and a spare pattern (spare section) P4. The position detecting pattern P1, reference color pattern P2, color code pattern P3, and spare pattern P4 are put in specified positions in the color-coded target CT1. In other words, the reference color pattern P2, color code pattern P3, and spare pattern P4 are disposed in the specified positions relative to the position detecting pattern P1.

The retro-target section P1 is used for the purposes of: detecting the retro-target itself, detecting its center of gravity, detecting position and direction (tilt direction) of the color-coded target CT1, and detecting the color code pattern area. In FIG. 1, the position detecting patterns P1 are provided at the three corners of the color-coded target CT1 (upper left, upper right, and lower left in the drawing), and a retro-target using retro-reflective material having the property of reflecting light in the direction of incident light is used on the white circular part. Here, the color-coded target CT1 of this embodiment will be described more specifically. On the color-coded target CT1, the origin is located in the center of the square outline (profile). Vertical and horizontal axes are drawn to pass the origin so that they divide the color-coded target CT1 into identical one-fourth squares in cooperation with the outline. Each of the small squares (identical one-fourth squares) or the first to fourth quadrants defined with the vertical and horizontal axes is further divided with vertical and horizontal axes passing in their respective centers into identical squares (one-sixteenth squares). As described above, the upper left 1/16 square of the second quadrant, the upper right 1/16 square of the first quadrant, and the lower left 1/16 square of the third quadrant are assumed to be a position detecting pattern P1. The lower right 1/16 square of the fourth quadrant is assumed to be a spare pattern P4. The retro-target of the position detecting pattern P1 of square shape has the above-mentioned white circle centered on the center of the square. The spare pattern is white in color.

The reference color section P2 is used to cope with color divergence (deviation) due to photographing conditions such as lighting, camera, etc., as a reference in relative comparison, or for calibration for correcting color divergence. The reference color section P2 may also be used for color correction of the color-coded target CT1 made by a simple method. For example, when a color-coded target CT1 printed with a color printer not controlled for color (such as a printer of inkjet-type, laser-type, or sublimation-type) is used, individual color difference occurs depending on the printer used. In such a case, effect of the individual difference may be suppressed by relative color comparison between the reference color section P2 and the color code section P3, followed by correction. In FIG. 1, the reference color section P2 is located in three unit areas R1-R3 around the upper left retro-target P1. As the three reference colors, for example, red, green, and blue, or the three primary colors of light, are used. In this embodiment, the unit areas R1-R3 are allotted to three 1/16 squares, other than the position detecting pattern P1 out of the 1/16 squares in the second quadrant. When the 1/4 square in the second quadrant is further divided into smaller squares of first to fourth quadrant, the unit area R1 is in the small first quadrant, R2 is in the small fourth quadrant, and R3 is in the small third quadrant.

The color code section P3 expresses the code by the combination of color dispositions to its unit areas C1-C6. The number of codes that may be expressed depends on the number of colors used for the codes. For example, in the case the number of colors for color codes is n, as the color-coded target CT1 of FIG. 1 has six unit areas C1-C6 in the color code section, the number of codes that may be expressed is $n^6$. The number of codes may be increased by increasing the number of colors for color codes. Even when a condition of prohibiting duplicate use of colors used in other unit areas is required, the number of codes that may be expressed is n! (When n=6, the number of codes is 6×5×4×3×2×1=720). Requiring such a condition makes it possible to reduce code reading errors. When a condition is further required that the number of the unit areas of the color code section P3 be the same as the number of colors for the color codes, all the code colors are used in the color-coded pattern P3. Therefore, it is possible to confirm the colors in respective unit areas and determine discriminating codes not only by comparison with the reference color pattern P2 but also mutual comparison of colors among unit areas of the color code pattern P3. Thus, reliability is improved. When a condition is additionally required that the areas of the unit areas in the color code section P3 be all the same, the areas occupied by the respective colors are the same for different color-coded targets CT1 having different discriminating codes. Therefore, almost the same dispersion value and histogram are obtained from the detected light from the entire color-coded pattern. Furthermore, the boundary between unit areas is repeated at equal intervals (when scanned in this embodiment, it is repeated at equal intervals around the center of the color-coded target CT1), and distinct color difference is detected. Therefore, it is easy to detect the color-coded targets CT1 out of the image. In this embodiment, three unit areas of reference color (reference color pattern P2) and a detecting target at the upper left position (position detecting pattern) P1 are located in the second quadrant of the color-coded target CT1; two color code sections P3 and one position detecting pattern P1 are located respectively in the first and second quadrant; and two unit areas of color code section P3 and a spare section are located in the fourth quadrant. The areas of the first, third, and fourth quadrants where the color code sections are located are respectively divided into two by straight radial lines passing the origin in the center of the color-coded target CT1, to form two areas of color code section P3 of trapezoidal shape respectively.

The spare section P4 is used for detecting the direction of the color-coded target CT1 and color difference calibration. Only one of the four corners of the target CT1 has no retro-target disposed; this corner may be used for detecting the direction (tilt) of the target CT1. Like this, the spare section P4 may be of white color or the like, any pattern different from the retro-target. Therefore, the spare section may be provided with a printed character string such as numerals for visually confirming the code, or may be used as a code area for a barcode, etc. The section may also be used as a template pattern for template matching to improve detection accuracy. It may also be used for checksum for checking code reading errors. For example, if a digit for checksum is added to the three numerals of a code expressed with three digits in 720 kinds, the first place becomes a specified value.

The color-coded target CT1 is printed on the front side of a rectangular sheet. The backside of the sheet is provided with adhesive or a magnetic sheet. In the case of adhesive, the color-coded target may be easily attached to the measured object 1 (refer to FIG. 8). In the case of the magnetic sheet, it may be easily attached to the measured object 1 when it is made of magnetic material such as iron. In either case, work efficiency of attaching the target is improved.

Figure 2:
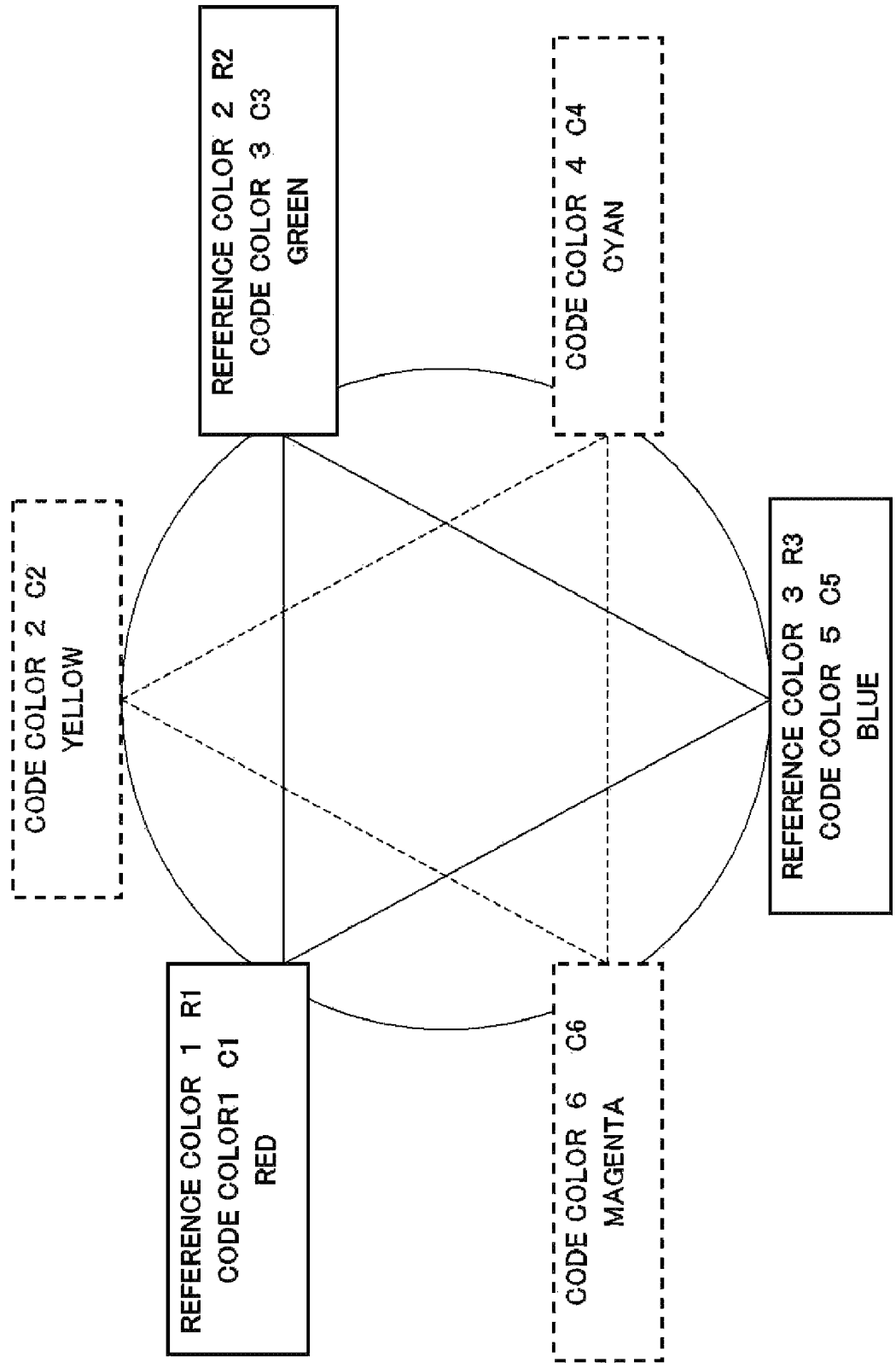
FIG. 2 shows the disposition of reference colors and code colors on a hue circle in the HSI color space.

FIG. 2 shows a disposition of reference colors and code colors on a hue circle in the HSI color space. In this way, colors shown on the hue circle of the HSI color space are used as the reference colors and code colors of the color-coded target CT1. Because colors in the HSI space are treated in terms of hue, saturation, and intensity, image processing using colors becomes easy to carry out. For example, three primary colors of light are used as the reference colors, and the number of code colors is chosen to be 6; the reference colors of red, green, and blue, plus yellow, cyan, and magenta; the last three being intermediate colors of the primary three. Colors of the color code pattern are chosen so that the hue difference between adjacent colors in the HSI color space is approximately even. The reason for choosing the reference colors and colors between the reference colors in the HSI color space as described above is to carry out color classification with high accuracy by a simple, convenient process.

Choosing in the way that the hue difference is nearly even is intended to enable clear discrimination of hues without making errors. Therefore, it is preferable to choose the interval between adjacent hues to be 360°/n (in this way, the minimum interval may be made as great as practicable). In this embodiment, n=6 and the interval is 60°. The range of hue divergence (deviation) is preferably ±360°/3n=20° or less, more preferably ±360°/6n=10° or less, and furthermore preferably ±360°/12n=5° or less. The disposition of reference colors in the unit areas R1-R3 in the reference color section P2 is common to all the color-coded targets CT1. The disposition of code colors in the unit areas C1-C6 in the code color section P3 is different for each of the individual color-coded targets CT1.

Figure 3A:
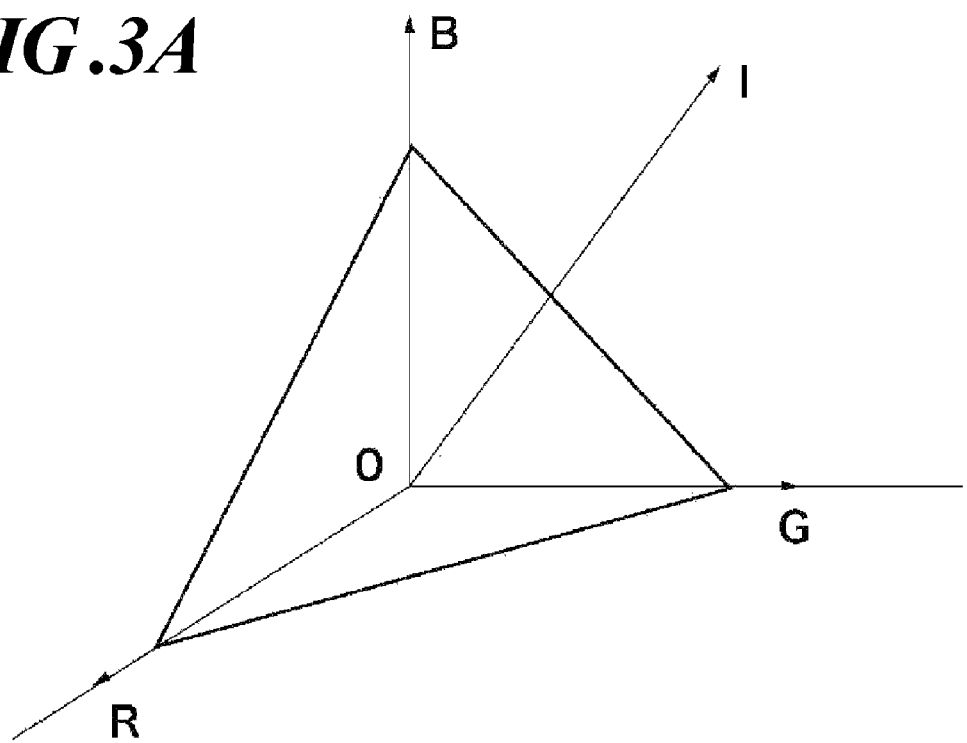
FIGS. 3A and 3B show comparison between the RGB color space and the HSI color space.
Figure 3B:
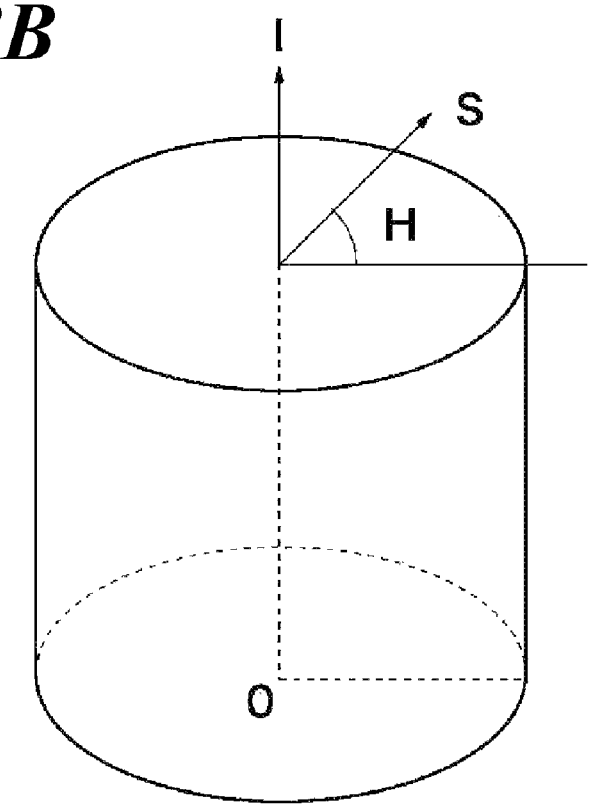

FIG. 3 shows the RGB color space and the HSI color space in contrast. FIG. 3A shows the RGB color space, and FIG. 3B shows the HIS color space. Colors in the RGB color space are expressed using the rectangular coordinate system. Colors in the HSI color space are expressed using the cylindrical coordinate system; with hue (H) plotted in circumferential (angular) direction, saturation (S) in radial direction, and intensity (I) in height direction.

[Color Code Extracting Device]

Figure 4:
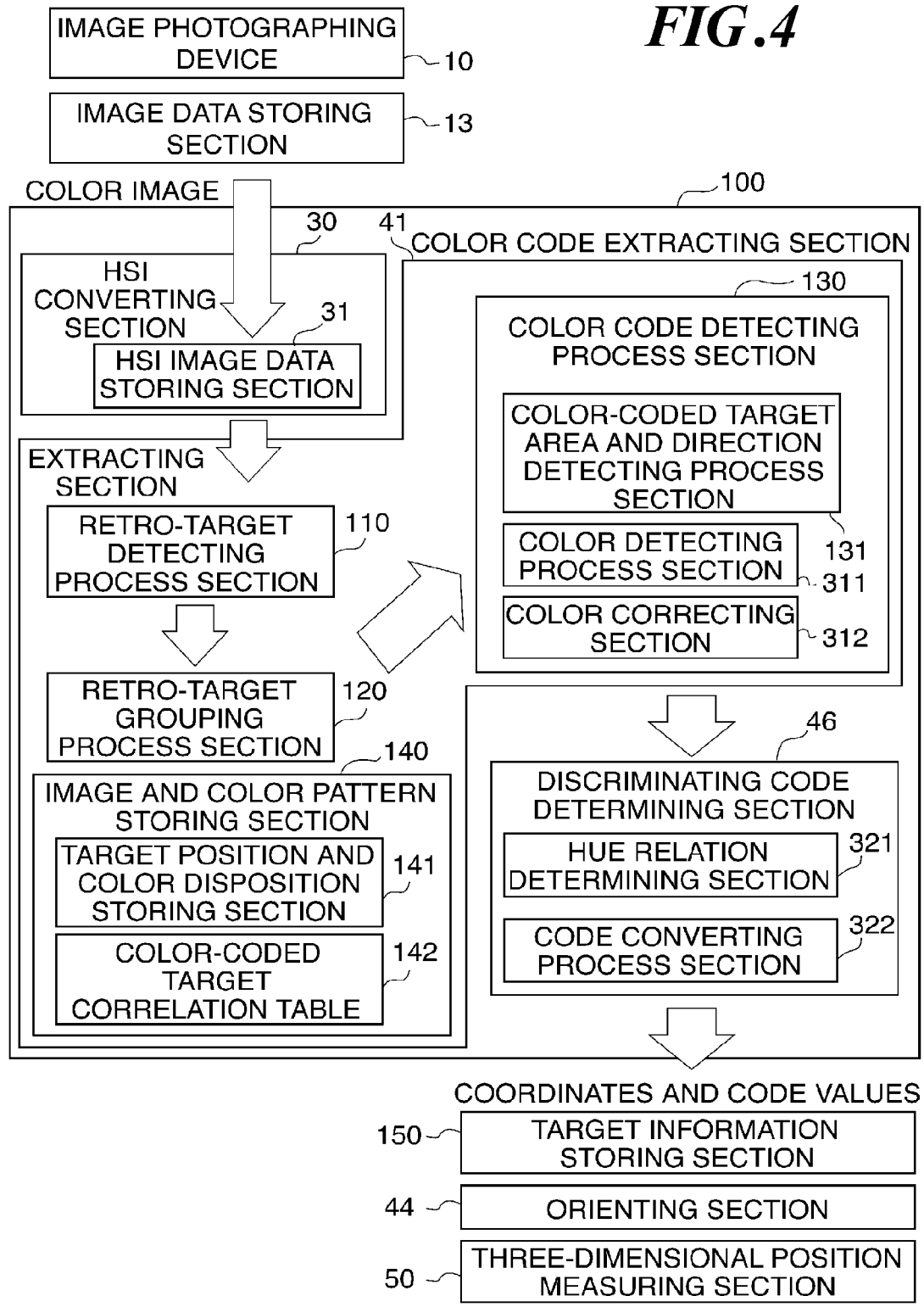
FIG. 4 shows an example constitution of a color code extracting device.

FIG. 4 shows an example constitution of color code extracting device. The color code extracting device 100 is configured with: an HSI converting section 30 for converting colors of photographed images into colors of HSI color space, an extracting section 41 for extracting the color-coded target CT1 (extracting the retro-target section P1, reference color section P2, and color code section P3), and a discriminating code determining section 46 for determining the color codes. The HSI converting section 30 has an HSI image data storing section 31. The extracting section 41 has: a retro-target detecting process section 110, a retro-target grouping process section 120, a color code detecting process section 130, and an image and color pattern storing section 140. The discriminating code determining section 46 has a hue relation determining section 321 and a code converting process section 322.

Also shown is an image photographing device 10, such as CCD stereo-camera, for photographing a measured object 1 including color-coded targets. As the CCD camera normally detects colors through an RGB filter, photographed images are perceived in the RGB color space. The numeral 13 stands for an image data storing section for storing stereo images or single photographic images taken with the image photographing device 10. A target information storing section 150 determines the relationship between the positional coordinates of the position detecting pattern P1 of the color-coded target CT1 extracted with the extracting section 41 and the discriminating code determined with the discriminating code determining section 46, and stores them. The data stored in the target information storing section 150 are used with the orienting section 44 for orientation and with the three-dimensional position measuring section 50 for measuring three-dimensional coordinates or three-dimensional shape of the surface of the measured object 1.

The HSI converting section 30 performs the HSI conversion process; a process of converting the colors of photographed images of the measured object 1 into colors in the HSI color space. Typically, input images are converted from the RGB color space into the Munsell color system (HSI color space), which approximates the human sense. The HSI-processed images are stored in the HSI image data storing section 31.

The retro-target detecting process section 110 performs the process of detecting retro-targets. The retro-target detecting process section 110, detects a retro-target pattern that is especially high in clarity as a position detecting pattern P1 out of the images that have been HSI-converted and stored in the HSI image data storing section 31 and determines its positional coordinates.

The retro-target grouping process section 120 performs the process of grouping the retro-targets. In other words, retro-targets detected with the retro-target detecting process section 110 and estimated to belong to the same color-coded target CT1, for example retro-targets with positional coordinates estimated to fall within the area of a certain color-coded target CT1, are grouped as candidates belonging to the same group.

The color code detecting process section 130 performs processes of confirming the grouping and color code detection. For this purpose, the section 130 comprises: a color-coded target area and direction detecting process section 131 for detecting the area and direction of the color-coded target CT1 from the group candidates of retro-targets estimated to belong to the same color-coded target CT1 and for confirming the combination of retro-targets constituting such color-coded targets CT1, a color detecting process section 311 for detecting disposition of colors of the color-coded targets CT1 in the reference color section P2 and the color code section P3 and the color of the measured object 1 in the image, and a color correcting section 312 for correcting the colors of the measured object 1 in the image and the colors in the color code section P3 while referring to the reference color pattern P2.

The image and color pattern storing section 140 comprises: a target position and color disposition storing section 141 for storing positional coordinates of the retro-target section P1 and the disposition of colors in the color code section P3, and a color-coded target correspondence table 142 for recording type-specific code numbers representing the types of the color-coded targets CT for a plurality of color-coded targets planned to be used and for recording corresponding relationship between pattern dispositions and code numbers for various types of color-coded targets CT.

The discriminating code determining section 46 determines a discriminating code from the disposition of colors in the color code section P3 and converts it into a discriminating code. For this purpose, the section 46 comprises: a hue relation determining section 321 for determining if the color code detected with the color code detecting process section 130 meets a certain hue correlation, and a code converting process section 322 for determining a discriminating code from the color disposition in the color code section P3 of the color-coded target CT1 and for converting it into a discriminating code (for affixing a code number).

[Color Code Extraction Flow]

Figure 5:
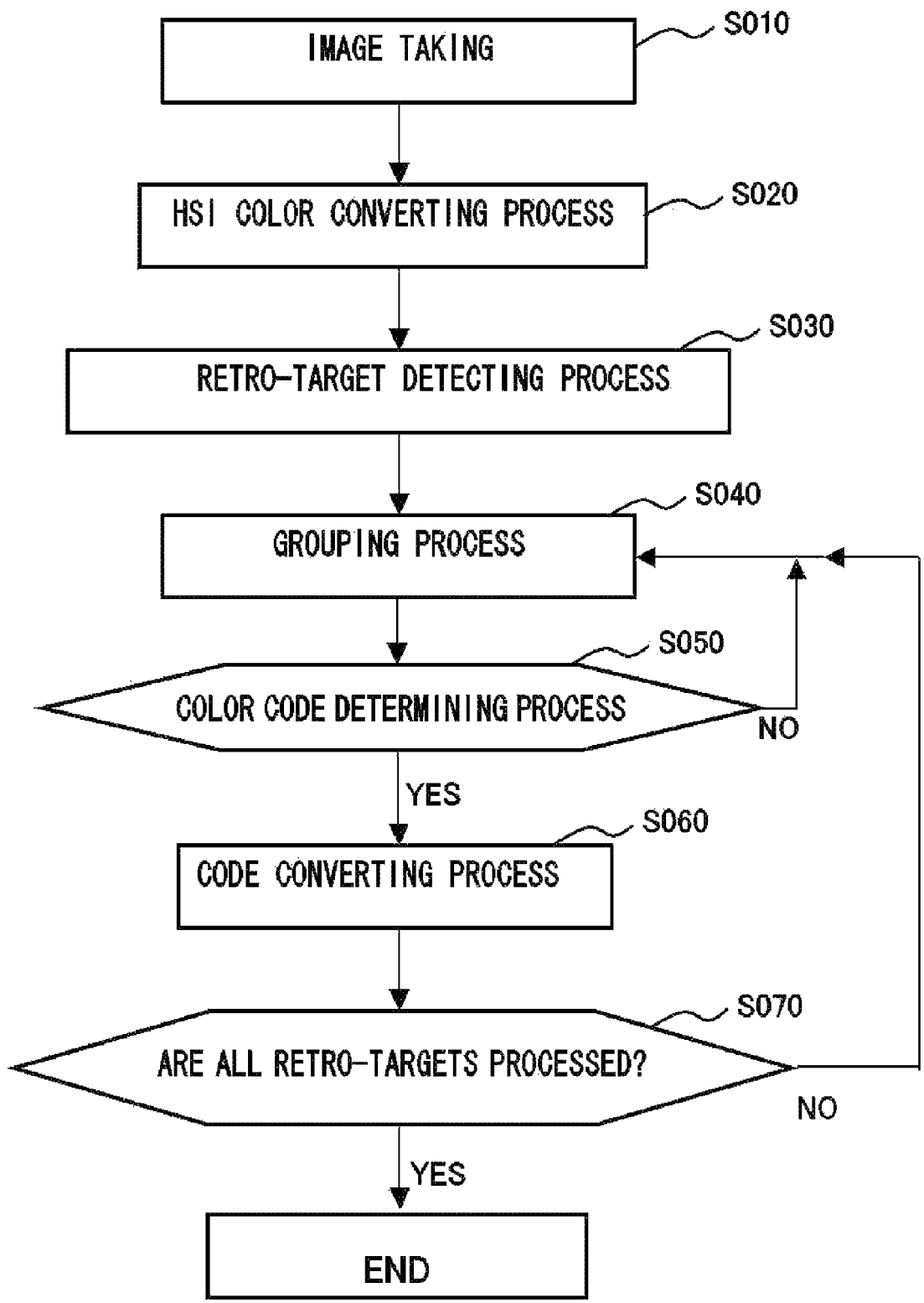
FIG. 5 shows an example flow of automatically detecting and processing color codes.

FIG. 5 shows an example flow of automatically extracting color codes. First, color images are taken with the image photographing device 10 such as a CCD stereo camera and acquired (S010). As the CCD camera normally detects colors through an RGB filter, the photographed images are sensed in the RGB color space, and data of RGB coordinates are inputted into the image data storing section 13.

Next, the HSI converting section 30 performs HSI converting process (S020). HSI conversion model includes: hexagonal pyramid model, twin hexagonal pyramid model, conical model, etc. The model we used here is a conical model proposed by Maeda and others (Refer to: Maeda, Murai. "HSI Conversion and Application to Multi-spectrum Data," *Photographic Survey and Remote Sensing*, vol. 26, No. 3, 1987, pp. 21-30). Converting equations (1-1) to (1-8) are shown below.

$$I = (R + G + B) \cdot \cos\theta \quad (1\text{-}1)$$

$$D = \sqrt{T_x^2 + T_y^2} \quad (1\text{-}2)$$

$$H = \tan^{-1}\frac{T_y}{T_x}, \, 0 \leq H \leq 2\pi \quad (1\text{-}3)$$

$$T_x = (G \cdot \cos\alpha + B \cdot \cos 2\alpha + R) \cdot \sin\theta \quad (1\text{-}4)$$

$$T_y = (G \cdot \sin\alpha + B \cdot \sin 2\alpha) \cdot \sin\theta \quad (1\text{-}5)$$

$$\alpha = \frac{2\pi}{3}, \, \tan\theta = \sqrt{2} \quad (1\text{-}6)$$

$$S = \frac{D}{d} = \frac{D \cdot \cos\left(\frac{\alpha}{2} - \beta\right)}{H \cdot \cos\frac{\alpha}{2} \cdot \tan\theta} \quad (1\text{-}7)$$

$$0.0 \leq S \leq 1.0, \, \beta = \mathrm{mod}(H, \alpha) \quad (1\text{-}8)$$

The HSI-converted image data, correlated with image position coordinates, are stored in the HSI image data storing section 31.

Next, the retro-target detecting process section 110 performs the process of detecting the retro-targets (S030). In the retro-target detecting process, part of an image circular and brighter than its vicinity is detected from the HSI-processed data using intensity component, and the center of gravity is determined.

FIGS. 6A and 6B are drawings for explaining the detection of center of gravity using a retro-target 200. In this embodiment, the retro-target is formed with two concentric circles. FIG. 6A (A1) shows a retro-target in which the inner circle portion 204 inside the smaller one of the concentric circles is high in intensity, while the outer circle portion 206 or annular portion formed between the small and large circles is low in intensity. FIG. 6A (A2) shows an intensity distribution chart in the diametrical direction of the retro-target of (A1). FIG. 6B (B1) shows a retro-target in which the inner circle portion 204 is low in intensity, while the outer circle portion 206 is high in intensity. FIG. 6B (B2) shows an intensity distribution chart in the diametrical direction of the retro-target of (B1). When the inner circle portion 204 of the retro-target is high in intensity as shown in (A1), the reflected light amount is great to be a bright part on the photographed image of the measured object 1. Therefore, the light amount distribution of the image becomes as shown in (A2) to make it possible to determine the inner circle portion 204 and the center position of the retro-target from the light amount threshold value $T_0$. In the case of (A1) in this embodiment, a single circle corresponding to the small circle in the center of the square position detecting pattern P1 may be formed. While the part outside the great circle may be either bright or dark, dark is preferable. When that part is dark, substantially a single circle only (small circle) is formed. In the case of (B1), while the part outside the great circle may be either bright or dark, making it bright is preferable. When the part outside the great circle is bright, actually a single dark circle only (small circle) is formed on a bright background.

When the range in which targets are present is determined, the position of center of gravity is calculated for example by the moment method. For example, planar coordinates of the retro-target 200 shown in FIG. 6A (A1) are assumed to be (x, y). Then, equations (2-1) and (2-2) are operated for points, in the directions of x and y, where the intensity of the retro-target 200 is not smaller than the threshold $T_0$.

$$xg = \Sigma\{x \times f(x,y)\}/\Sigma f(x,y) \quad (2\text{-}1)$$

$$yg = \Sigma\{y \times f(x,y)\}/\Sigma f(x,y) \quad (2\text{-}2)$$

Coordinates (xg, yg) are those of the position of center of gravity. f(x, y) is the intensity value at the position (x, y).

In the case of the retro-target 200 shown in FIG. 6B (B1), the equations (2-1) and (2-2) are operated for points in the directions of x and y where intensity is not greater than the threshold $T_0$. Thus, the position of center of gravity of the retro-target 200 is determined.

In reference to FIG. 5 again, the retro-target detecting process section 110 stores the coordinates of a plurality of retro-targets detected from color images into a target position and color disposition storing section 141.

Next, the retro-target grouping process section 120 performs a grouping process (S040). The grouping process is a process of determining a combination of retro-targets constituting the color-coded targets. The retro-target grouping process section 120 detects candidates of a group of retro-targets estimated to belong to the same color-coded targets CT1 from coordinates of the retro-targets stored in the target position and color disposition storing section 141 (chooses, for example from the center of gravity points detected by the retro-target detecting process, three center of gravity points located at short distances to each other), and stores the combination of them in the target position and color disposition storing section 141.

Next, the color code detecting process section 130 performs grouping confirmation process and color code detection process. First, the color-coded target area and direction processing section 131, concerning the candidates grouped with the retro-target grouping process section 120, confirms that the three retro-targets belong to the group constituting the single color-coded target CT1 by measuring the distances between the three retro-targets constituting the group (distance ratio of 1:1:√2) and by measuring the apex angles of the three apexes of the triangle formed with the three retro-targets (90°, 45°, and 45°), affixes a (tentative) group number of the color-coded target CT1 to the three retro-targets, and stores them in the target position and color disposition storing section 141. At this time, a squarely viewed image of the color-coded target is also stored into the target position and color disposition storing section 141; the squarely viewed image is produced by correcting the size and tilt of the color-coded target CT1 detected with the color-coded target area and direction detecting process section 131 (for example, by correcting to a square pattern having sides of the same dimensions in actual size without tilt in reference to the upper left retro-target position). In the case the distances between the three retro-targets and the apex angles do not meet the above condition, they are determined not to constitute a group. Then, the process goes back to the grouping step (S040) to search another combination.

Next, the color detecting process section 311, using the squarely viewed image, concerning the candidates of the group-numbered color-coded targets, detects color disposition in the reference color section P2 and the color code section P3 of the color-coded target CT1, and colors of the measured object 1 in the image. Next, the color correcting section 312, in reference to the reference color pattern P2, corrects the colors of the measured object 1 in the image and of the color code section P3 and the image.

Figure 7A:
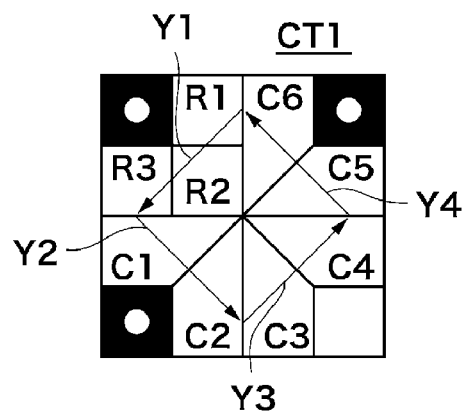
FIGS. 7A, 7B and 7C are drawings for explaining the detection of color disposition in the reference color section and color code section of the first embodiment.
Figure 7B:
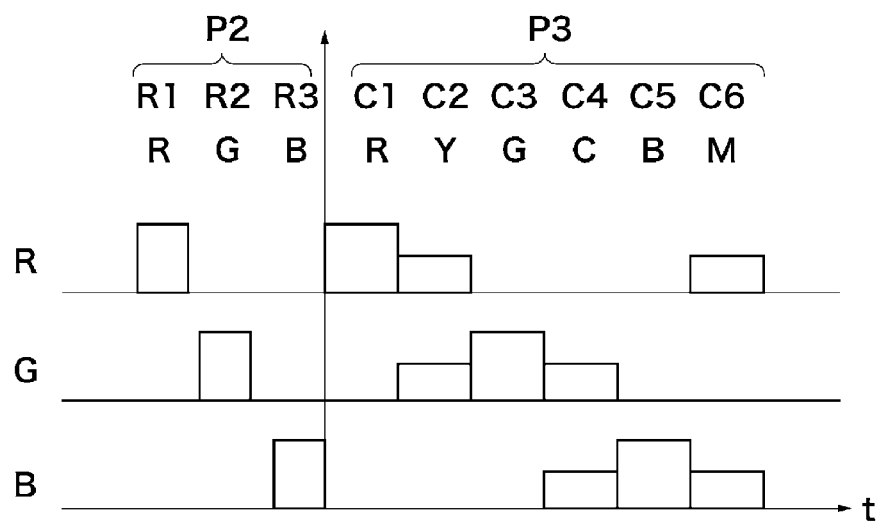
Figure 7C:
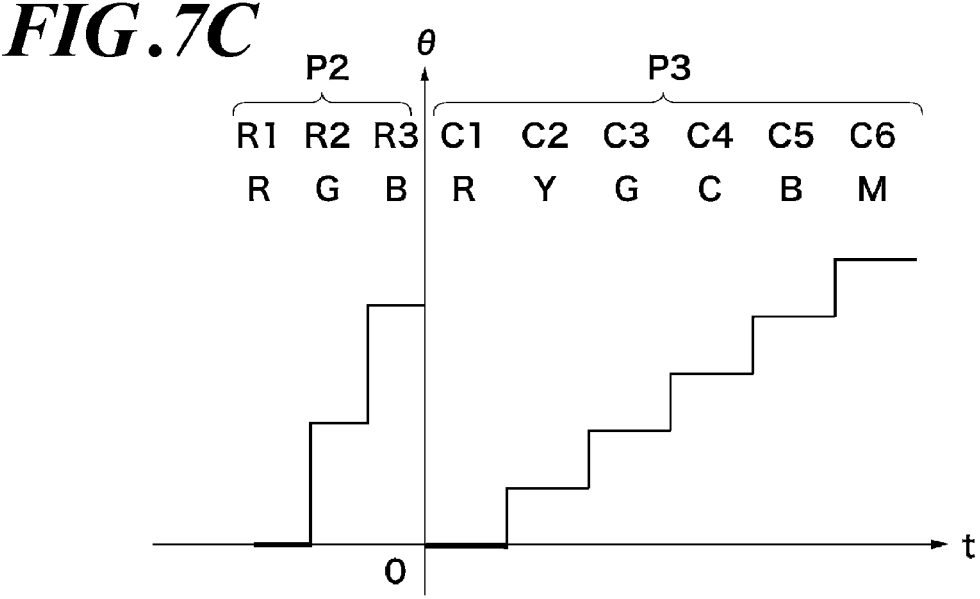

FIGS. 7A, 7B and 7C are drawings for explaining the detection of the color disposition of the reference color section P2 and the color code section P3 with the color detecting process section 311. FIG. 7A shows an example disposition of colors on the color-coded target CT1. In this example, colors of the unit areas R1-R3 of the reference color section are made red, green, and blue, respectively; and colors of the unit areas C1-C6 of the color code section are made red, yellow, green, cyan, blue, and magenta, respectively. FIG. 7B shows the intensity of light for the unit areas R1-R3, and C1-C6 when colors are expressed in the RGB color space. The RGB components of the unit areas R1-R3, and C1-C6 are expressed with one or two components of the RGB coordinate system, and are divided into 6 patterns. FIG. 7C shows hues of the unit areas R1-R3, and C1-C6 expressed in the HSI color space. In the HSI space, the colors of the unit areas R1-R3, and C1-C6 are expressed by hues or angles θ in 6 angles at even intervals. As shown in FIG. 7A, colors on the images of the color-coded target CT1 are detected by scanning R1-R3 as shown with the arrow Y1 traversing nearly evenly. Further, C1-C2, C3-C4, and C5-C6 are scanned as shown with the arrow Y2-Y4 traversing nearly evenly. As a result, in the RGB space, a time-wise or space-wise transition patterns of RGB light intensity moving from left to right in FIG. 7B is obtained for the RGB color space (scanning time is represented by t). In the HSI color space, a time-wise or space-wise transition patterns of hue θ moving from left to right in FIG. 7C is obtained for the HSI color space (scanning time is represented by t). These transition patterns are common to R1-R3 for all the color-coded targets CT1. As to C1-C6, they are different for differently color-coded targets CT1. The time-wise or space-wise transition pattern of hues θ detected for differently color-coded targets CT1 are stored in the target position and color disposition storing section 141.

The color correcting section 312 has a correspondence table of colors red, green, and blue employed as reference colors corresponding to reference hues of $\theta_R=0°$, $\theta_G=120°$, and $\theta_B=240°$. When the hues of the unit areas of the reference color section P2 in the time-wise or space-wise transition pattern of hues θ detected for differently color-coded targets CT1 are detected with deviation from $\theta_R=0°$, $\theta_G=120°$, and $\theta_B=240°$ (the amounts of deviation are expressed as $\delta\theta_R$, $\delta\theta_G$, and $\delta\theta_B$ respectively), the hues of the unit areas of the reference color section P2 of the color-coded targets CT1 are corrected to $\theta_R=0°$, $\theta_G=120°$, and $\theta_B=240°$. Concerning the colors employed as color code colors of the color-coded section P3, as to red, green, and blue, $\delta\theta_R$, $\delta\theta_G$, and $\delta\theta_B$ are subtracted. As to yellow, cyan, and magenta, for example $(\delta\theta_R+\delta\theta_G)/2$, $(\delta\theta_G+\delta\theta_B)/2$ and $(\delta\theta_B+\delta\theta_R)/2$ are subtracted from hues $\theta_Y$, $\theta_C$, and $\theta_M$ respectively. Additionally, when results of subtraction are close to 60°, 180°, and 300° (within ±10° for example), they are corrected to $\theta_Y=60°$, $\theta_C=180°$, and $\theta_M=300°$. When not close, only the former corrections are made, without making the latter corrections. This code color correction is applied to the time-wise or space-wise transition pattern of hues θ. The corrected time-wise or space-wise transition pattern of hues θ are stored in the target position and color disposition storing section 141.

In reference to FIG. 5 again, as the next step, the discriminating code determining section 46 determines discriminating codes from the disposition of colors in the color code section P3 and converts them into discriminating codes. The hue relation determining section 321 performs the process of determining color code determination (S050). In other words, concerning the color-coded target CT1 formed while including center of gravity points grouped by the grouping process in three corners of the square, determination is made whether or not the hues in the reference color section P2 and color code section P3 meet the certain hue relationship (conditions to be color-coded targets). For example, hue (H) components in three points (R1, R2, and R3) in the reference color section P2 are compared, to determine if relative magnitude relationship holds between the hue components by applying the conditional equations (3-1) and (3-2). However, as the hues are expressed in angle and the values are recurrent, care should be exercised in the comparison.

$$H_{R1} \leq H_{R2} \leq H_{R3} \quad (3\text{-}1)$$

$$H_{R3} \leq H_{R1}+2\pi \quad (3\text{-}2)$$

Next, the hue relation determining section 321 determines if colors of the color code section P3 are red, green, blue, yellow, cyan, and magenta; and if each color is used only in a single unit area (not duplicated). This determination is made by comparison of hue component values between the reference color section P2 and the color code section P3 using the conditional equations (4-1)-(4-6). Also this comparison requires caution because the hue values compared are recurrent.

$$H_{R1}-m \leq \text{Red} \leq H_{R1}+m \quad (4\text{-}1)$$

$$H_{R2}-m \leq \text{Green} \leq H_{R2}+m \quad (4\text{-}2)$$

$$H_{R3}-m \leq \text{Blue} \leq H_{R3}+m \quad (4\text{-}3)$$

$$H_{R1}+m \leq \text{Yellow} \leq H_{R2}-m \quad (4\text{-}4)$$

$$H_{R2}+m \leq \text{Cyan} \leq H_{R3}-m \quad (4\text{-}5)$$

$$H_{R3}+m \leq \text{Magenta} \leq H_{R1}+2\pi m \quad (4\text{-}6)$$

where m represents a constant for margin.

When the color code determination process (S050) results in that the conditions for the color-coded target are met (yes), the code converting process section 322 of the discriminating code determining section 46 performs a code converting process (S060). When the determination results in that the conditions for the color-coded target are not met (no), the process goes back to the grouping process (S040) to perform a grouping process using new center of gravity points.

The code converting process (S060) is a process of reading codes from the color code section P3 of the color-coded target CT1. The code converting process section 322 determines the disposition of colors in the color code section P3 based on the time-wise or space-wise transition pattern whose color disposition is detected with the color detecting process section 311 and corrected in the color correcting section 312. The code converting process section 322 determines code values, referring to the code conversion table (color-coded target corresponding table) 142 of the image and color pattern storing section 140 storing the relationship between 720 kinds of color dispositions of the color codes and the code values (numbers).

Next, the color code extracting device 100 determines whether or not the center of gravity point data of all the retro-targets are processed (S070). If there are some determined center of gravity data that are not processed yet (no), the process goes back to the grouping process (S040). When all the center of gravity points are processed (yes), the automatic color code detecting process is over. The positional coordinates of the position detecting pattern P1 of the color-coded target CT1 extracted with the extracting section 41 are related to the discriminating codes determined with the discriminating code determining section 46, and stored in the discrimination information storing section 150.

[System Constitution]

Figure 8:
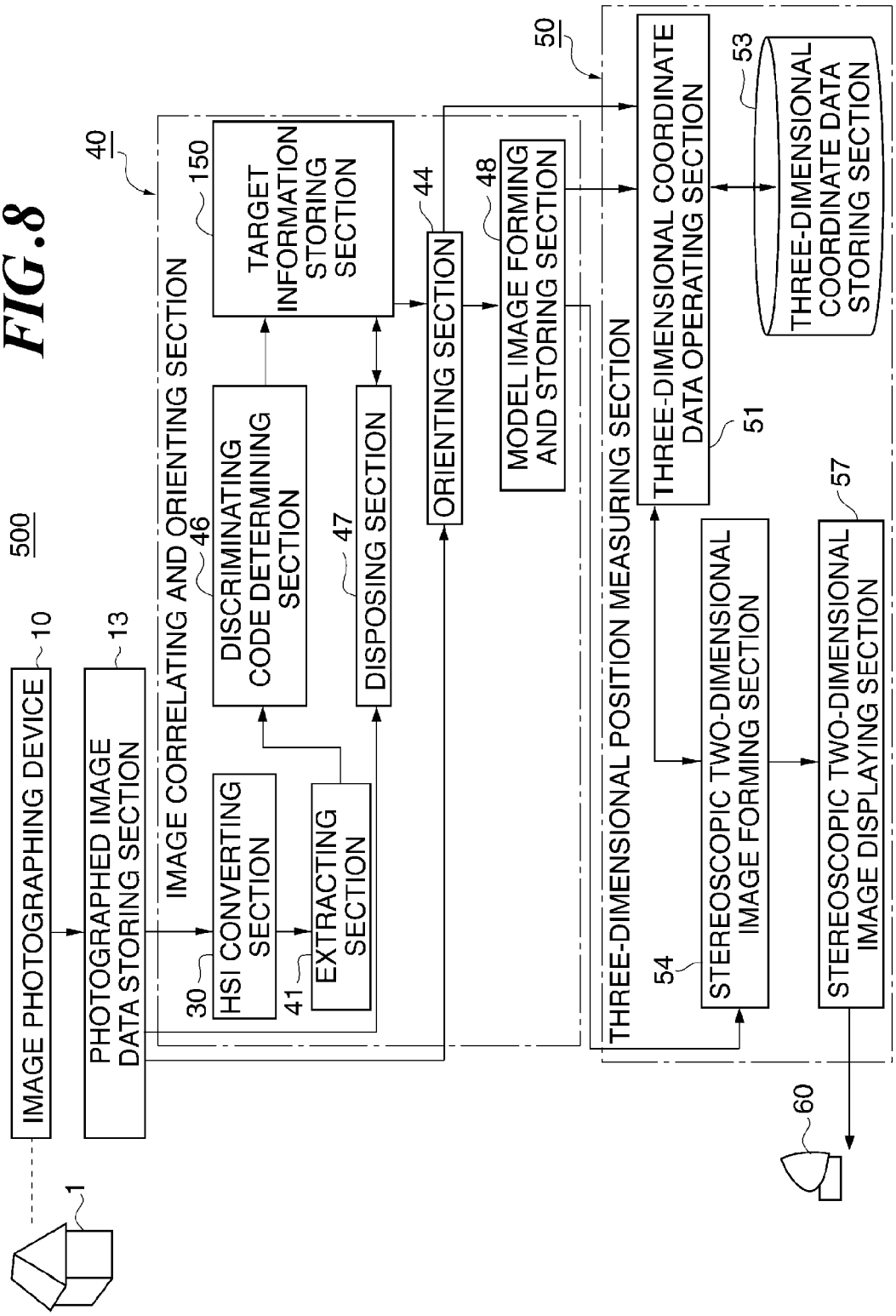
FIG. 8 is an example of a block diagram of an overall constitution of a three-dimensional measuring system of the first embodiment.

FIG. 8 is a block diagram of an example of an overall constitution of a three-dimensional measuring system of this embodiment. The three-dimensional measuring system 500 comprises: an image photographing device 10, a photographed image data storing section 13, an image correlating and orienting section 40, a three-dimensional position measuring section 50, and a displaying device 60. Of these, the photographed image data storing section 13, the image correlating and orienting section 40, and the three-dimensional position measuring section 50 are constituted with, for example, computers. The measured object 1 is a tangible object to be constructed or manufactured, for example various artificial objects such as a building, factory, etc. or a person, scenery, etc.

The image photographing device 10 is a device for taking images of the measured object 1, such as a general purpose digital camera (CCD camera, etc.) used in combination with a device for compensating for lens aberration of the images of the measured object 1 taken with the camera. The images are taken with a stereo camera, or with a single camera moved from one position to another. The photographed image data storing section 13 is for storing images of the measured object 1 to store a single photographic image or stereo images of the measured object 1 taken for example with the image photographing device 10.

The image correlating and orienting section 40 performs orientation or matching by correlating a pair of photographed images of the measured object 1; extracts coded targets, discriminates their codes to determine correlation between target positions of the images, and performs orienting process. It also performs stereo matching at the time of three-dimensional measurement of the surface of the measured object 1. It comprises: an extracting section 41, the orienting section 44, the discriminating code determining section 46, a disposing section 47, a model image forming and storing section 48, and the target information storing section 150.

As for the HSI converting section 30 for converting the colors of the photographed images into the colors in the HSI color space, the extracting section 41 for extracting color-coded targets CT1, and the discriminating code determining section 46 for discriminating the color codes, refer to the explanation on the color code extracting device 100. The HSI converting section 30 has an HSI image data storing section 31. The extracting section 41 comprises: a retro-target detecting process section 110, a retro-target grouping process section 120, a color code detecting process section 130, and an image and color pattern storing section 140. The discriminating code determining section 46 comprises a hue relation determining section 321 and the code converting process section 322.

The disposing section 47 determines the disposition, concerning a series of photographed images photographed with the image photographing device 10, so that each image contains at least 4 color-coded targets CT1 and that adjacent images have in common at least two color-coded targets CT1, so that the discriminating codes of the color-coded targets CT1 the adjacent images have in common are in agreement.

Here, disposition of photographed images is determined using information on the color-coded targets CT1 stored in the target information storing section 150. For the stereo images photographed with a stereo camera (including similar individual images taken as a pair), out of the images registered in the photographed image data storing section 13, a pair of images, in which the color-coded targets CT1 having the same discriminating codes are similarly disposed, are extracted and assumed to be a stereo pair of right and left images. In the stereo pair of right and left images, correspondence of points is already established between retro-targets of the color-coded targets CT1 having the same discriminating codes, so that corresponding points need not be searched. In contrast, when a series of photographed images are constituted with individual photographed images, codes of color-coded targets CT1 contained in the photographed images are read to determine the disposition of a series of photographed images so that adjacent images have the same color-coded targets CT1 in common. The disposition of a series of images determined in the disposing section 47 is stored in the target information storing section 150.

The orienting section 44, based on photographing positions and tilt of a plurality of images, performs orienting process including mutual orientation and bundle adjustment to determine external orientation elements or positions and tilt of the camera used for photographing. In the case stereo images are used, as corresponding points are formed between retro-targets of the color-coded targets CT1 having the same discriminating code, mutual orientation is performed using these points. While the mutual orientation requires 6 or more corresponding points, if two or more color-coded targets CT1 are present in common in the right and left images, 6 or more retro-targets are contained, which suffices for mutual orientation. In contrast, in the case a series of photographed images are constituted with individual pictures, orienting process is performed by bundle adjustment based on coordinates on the images of the retro-targets of the color-coded targets CT1 contained in a plurality of photographed images. Also for the stereo images mutually oriented, in the case a series of stereo images are constituted, bundle adjustment is performed on the basis of coordinates on the images of the retro-targets of the color-coded targets CT1 contained in a plurality of photographed images.

In the case stereo images are used, the model image forming and storing section 48 forms a model image from parameters (positions and tilt of the camera used for photographing) produced by the orienting process with the orienting section 44, and stores the model image. Here, the model image is also called as deviation-corrected image in which corresponding points of a pair of right and left photographed images are re-positioned on the same epipolar line to enable three-dimensional viewing. In contrast, in the case a series of photographed images are constituted with individual pictures, a model image need not be formed.

The three-dimensional position measuring section 50 is, in the case stereo images or image data oriented to the measured object 1 with the orienting section 44 are used, to measure three-dimensional coordinate data of the measured object 1 on the basis of model image data of the measured object 1 produced with and stored in the model image forming and storing section 48 and stored and to form a stereoscopic two-dimensional image of the measured object 1 from an arbitrary direction; and comprises: a three-dimensional coordinate data operating section 51, a three-dimensional coordinate data storing section 53, a stereoscopic two-dimensional image forming section 54, and a stereoscopic two-dimensional image displaying section 57.

The three-dimensional coordinate data operating section 51 determines three-dimensional coordinate data of the surface of the measured object 1 on the basis of position coordinate data of the color-coded targets CT1 determined with the orienting section 44 or formed with and stored in the model image forming and storing section 48. In the three-dimensional coordinate data storing section 53 are stored three-dimensional coordinate data of the measured object 1 operated with the three-dimensional coordinate data operating section 51.

The stereoscopic two-dimensional image forming section 54 forms a stereoscopic two-dimensional image of the measured object 1 from the three-dimensional coordinate data. Here, the stereoscopic two-dimensional image means a stereoscopic expression of the shape of the measured object 1 using three-dimensional coordinate data so that for example a perspective view from an arbitrary direction is obtained. The stereoscopic two-dimensional image displaying section 57, using an image having stereoscopic texture like a bird's-eye view, displays on the displaying device 60 a two-dimensional image having a stereoscopic impression. As the displaying device 60, an image displaying device such as a liquid crystal display and cathode-ray tube (CRT) may be used.

[Action of System]

Figure 9:
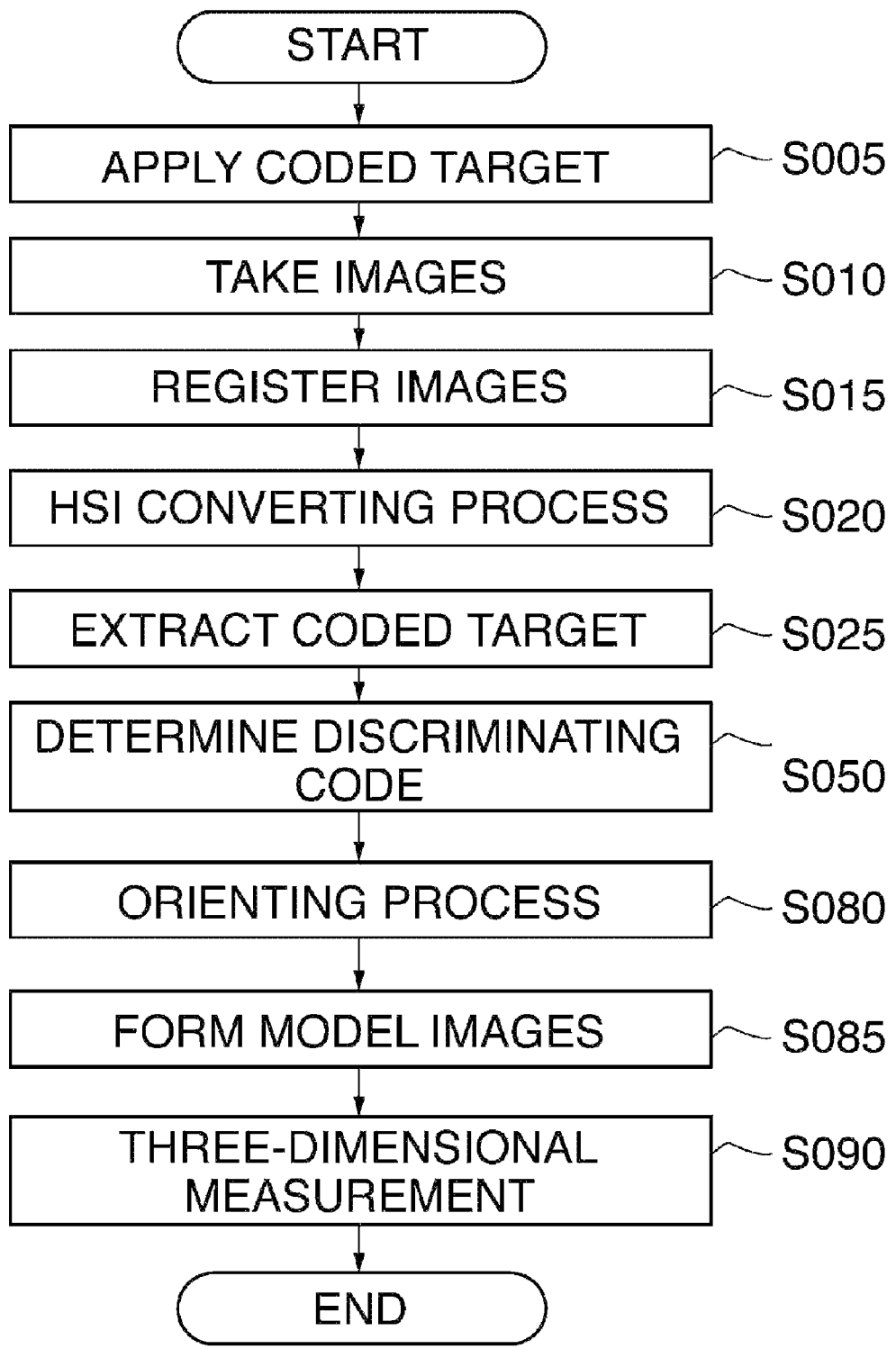
FIG. 9 shows an example flowchart for explaining the action of the three-dimensional measuring system of the first embodiment.

FIG. 9 shows an example flowchart for explaining the action of the three-dimensional measuring system. First, coded targets are applied to the photographed object 1 (S005). The positions where the coded targets are applied are to be measured positions. In this embodiment, it is assumed that color-coded targets CT1 are used as the coded targets. Next, images of the measured object 1 are photographed using an image photographing device such as a CCD camera (S010; images to be processed may be a number of images containing overlapping areas, stereo images photographed with a certain base length, or a collection of single picture images). The photographed images are registered in the photographed image data storing section 13 (S015). Next, the HSI converting section 30 converts colors of the photographed images into colors of the HSI color space (S020).

Next, the image correlating and orienting section 40, using the extracting section 41, extracts color-coded targets CT1 from the photographed images registered in the photographed image data storing section 13 (S025). Next, discriminating codes of the extracted color-coded targets CT1 are determined with the discriminating code determining section 46 (S050). The position coordinates of the position detecting pattern P1 of the color-coded targets CT1 extracted with the extracting section 41 are correlated to the discriminating codes determined with the discriminating code determining section 46 and stored in the discriminating information storing section 150.

Incidentally, the disposing section 47 determines the disposition of the photographed images using information on the color-coded targets CT1 stored in the target information storing section 150. This makes it possible to draw out stereo pair images and a series of photographed images.

Next, the orienting section 44 performs an orienting process (S080). Here, the orienting process means a process of determining the external orienting elements or the positions and tilt of the camera used for photographing on the basis of photographing positions and tilt for a plurality of images. The orienting process makes it possible to determine the positions, tilt, corresponding points, and measurement accuracy of the camera used for photographing. In the case stereo images are used, mutual orientation is performed using coordinates on the images of the retro-targets of the color-coded targets CT1 having the same discriminating code. In contrast, in the case a series of photographed images are constituted with individual pictures, the orienting process is performed by bundle adjustment based on coordinates on the images of the retro-targets of the color-coded targets CT1 contained in a plurality of photographed images. Also for the stereo images mutually oriented, in the case a series of stereo images are constituted, bundle adjustment is performed on the basis of coordinates on the images of the retro-targets of the color-coded targets CT1 contained in a plurality of photographed images.

Next, in the case stereo images are used, the model image forming and storing section 48 forms a pair of deviation-corrected images (model images) by deviation correcting process based on the external orienting elements oriented with the orienting section 44 (S085). The deviation-corrected images are images rearranged so that epipolar lines (EP) of right and left images lie on a single horizontal line. Therefore, reference points (RF) of the right and left images are rearranged on the same epipolar line (EP, horizontal line). When model images are formed using the results of the orienting process, deviation-corrected images as described above are obtained. Furthermore, measuring accuracy is improved by repeating the orienting process by using the model image obtained as a result of the orienting process. In contrast, in the case a series of photographed images are constituted with individual pictures, a model image need not be formed.

Next, the three-dimensional measuring section 50 determines three-dimensional coordinates of the measured object 1 by the operation process with the three-dimensional coordinate data operating section 51 (S090). The three-dimensional coordinate data determined with the three-dimensional coordinate data operating section 51 are stored in the three-dimensional coordinate data storing section 53. The stereoscopic two-dimensional image forming section 54 forms a stereoscopic two-dimensional image of the measured object 1 from the three-dimensional coordinates read out of the three-dimensional coordinate data storing section 53. The stereoscopic two-dimensional image displaying section 57 displays on the displaying device 60 the formed stereoscopic two-dimensional image of the measured object 1 as an image having for example stereoscopic texture.

[Test Results]

Figure 10:
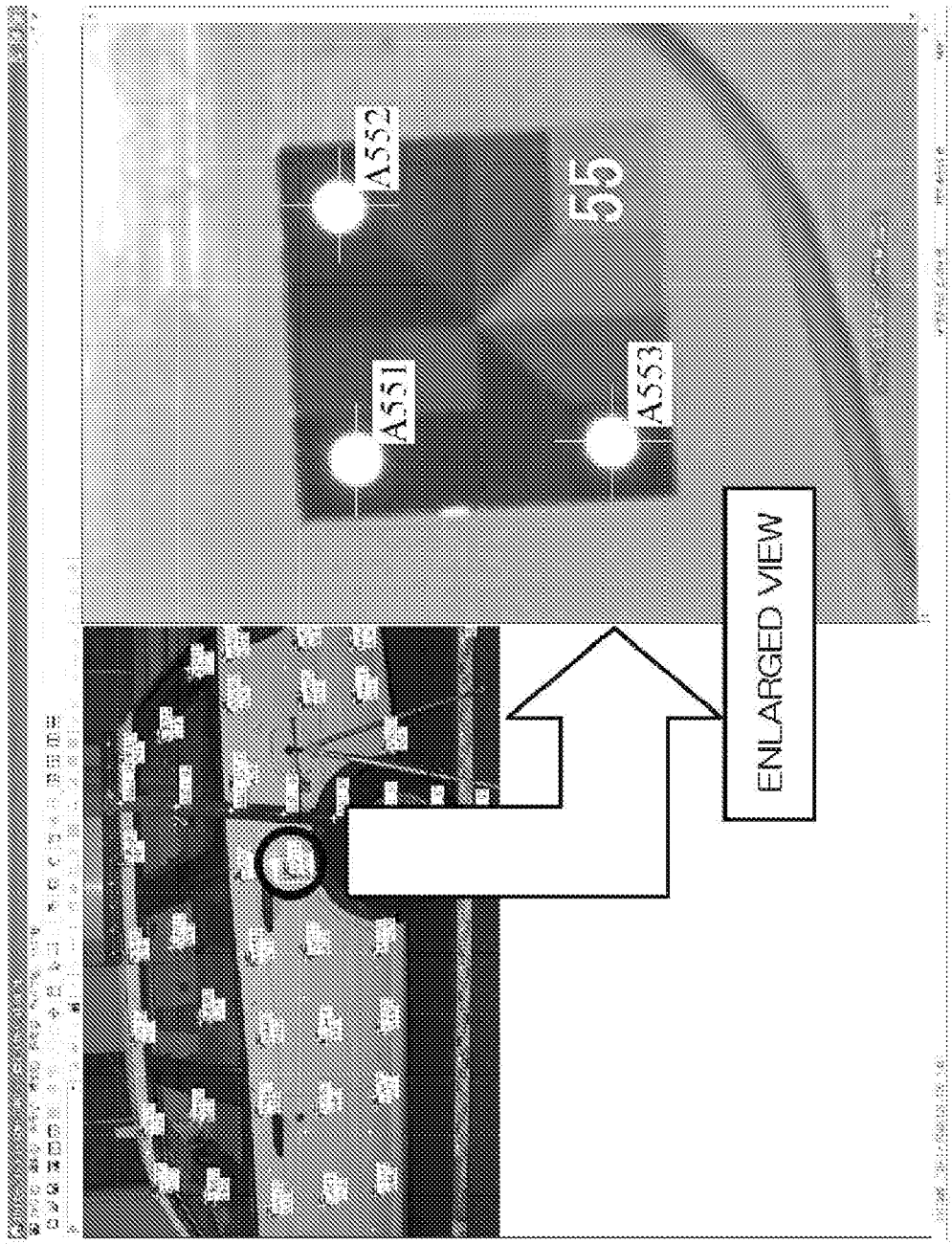
FIG. 10 shows a drawing of a result of identification by automatically detecting a color-coded target attached to a station wagon place outdoors.

FIG. 10 shows a drawing of a result of identification by automatically detecting color-coded targets CT1 attached on the outside of a station wagon (measured object) placed outdoors. The station wagon was measured for its entire circumference. The number of images was 36, and the number of stereo pairs was 32. As can be seen, three retro-targets of the color-coded targets CT1 are provided with numbers. It was possible to perform the orienting work by automatic detection only. There have been no detection errors such as incorrect conversion of color-coded targets CT1 or incorrectly detecting places other than the color-coded targets CT1 as color-coded targets CT1. Incidentally in FIG. 10, the spare sections P4 were used to display for visual observation of the code numbers expressed with numerals. In the enlarged view portion of FIG. 10, an example of code number is indicated with numerals 55. While the code number is expressed with three digits (like A55), indicating it in three digits results in small characters, which are hard to discern. Therefore, the last two digits (55) are used for expression.

Figure 11:
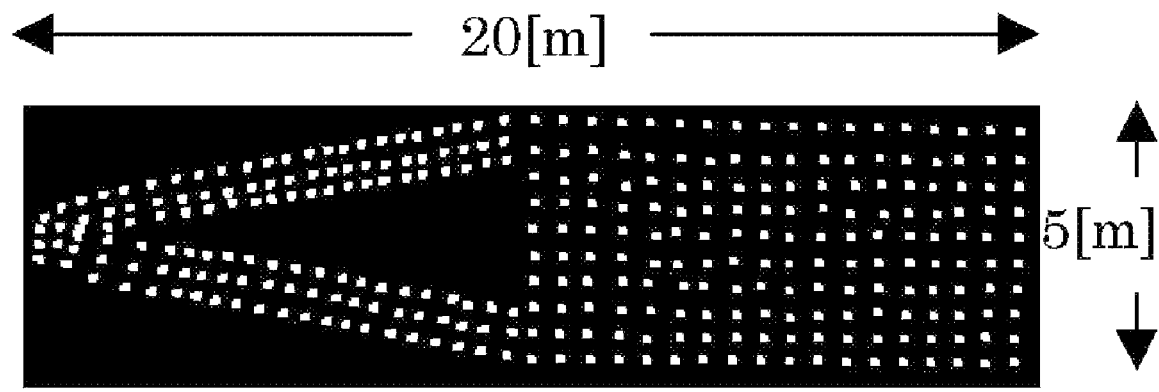
FIG. 11 shows a result of identification by automatically detecting color-coded targets attached to the floor.

FIG. 11 shows a result of identification by automatically detecting a color-coded target CT1 placed on a floor of a 20 m by 5 m area (measured object). The number of images was 214 and the number of stereo pairs was 194. The photographed area of one image was about 1.5 m by 1.5 m. Photographing position was moved at about 0.5 m intervals to produce overlapped photographic images. The result was obtained by automatically identifying the color-coded targets CT1 and by calculating the three-dimensional coordinate positions of the color-coded targets CT1 placed on the floor. The number of white dots was about 300 in the three-dimensional positions of the color codes. While a manual identification work requires about 6 hours, the identifying process by automatic detection required one hour or 16.7% of the former. All of 2049 images of color-coded targets were detected, accomplishing 100% of detection rate without detection errors. To see the change in detection rate relative to the change in sunlight, this test used data taken under clear weather conditions between 17:00 and 18:00. It was possible to detect the color-coded targets CT1 with 100% of detection rate in a stabilized manner.

Figure 12:
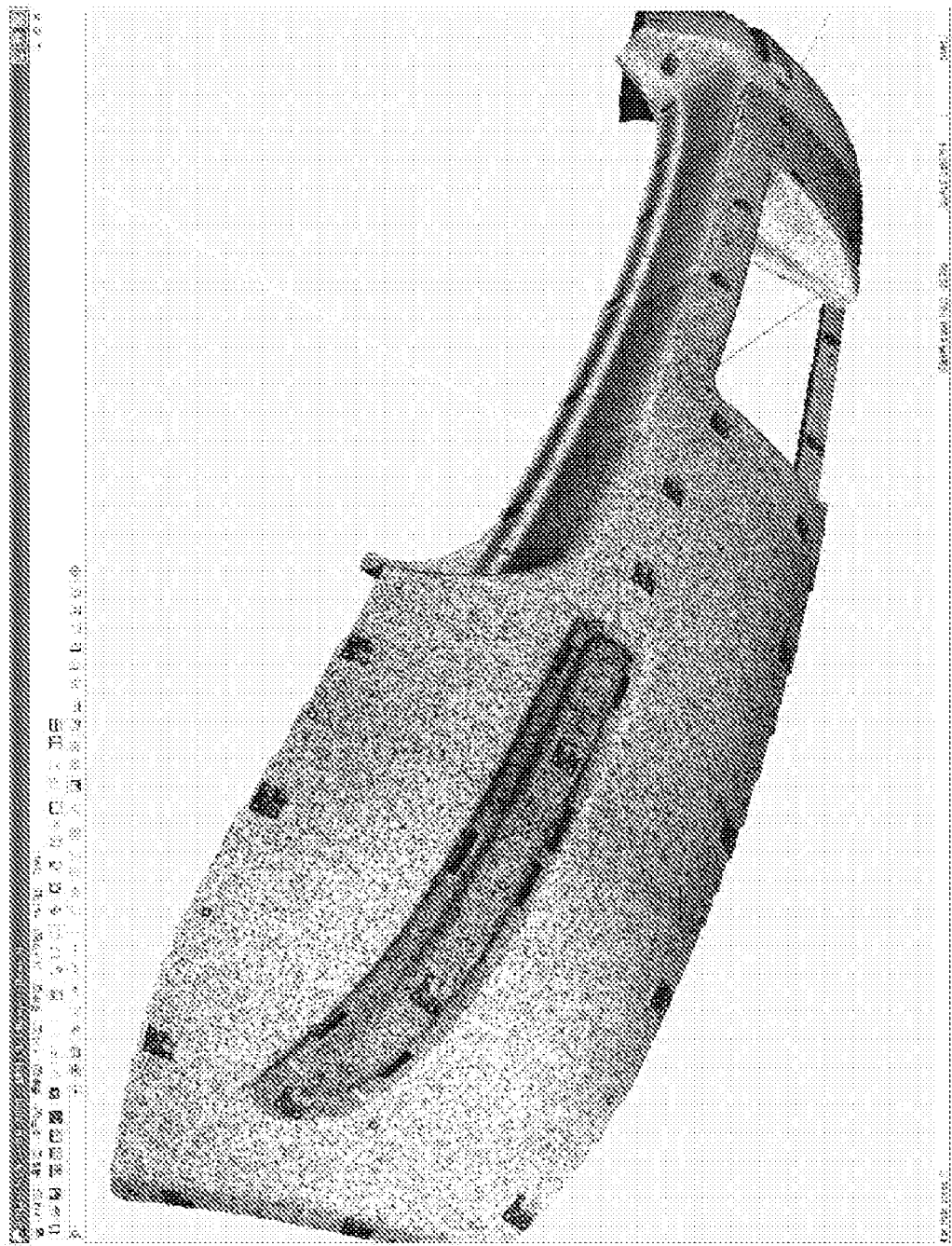
FIG. 12 shows the result of analysis with color-coded targets attached to the front bumper of a vehicle, automatically detected, and analyzed as a three-dimensional surface.

FIG. 12 shows results of a test in which color-coded targets CT1 were attached to the front bumper of a vehicle (measured object), automatically detected, and analyzed as a three-dimensional surface. It was possible to make identifying work by automatic detection only without detection errors. In this test, analysis on the surface is performed in addition to the process for points. It was possible to make image connection between 14 pairs of 28 images (56 images when random pattern-illuminated images are included) without any problem, and to make a bumper modeling drawing.

As described above, this embodiment makes it possible to provide color-coded targets having color codes of colors chosen to make code reading errors less likely to occur and to provide a process technique for automatically detecting the color-coded targets.

Second Embodiment

Figure 13:
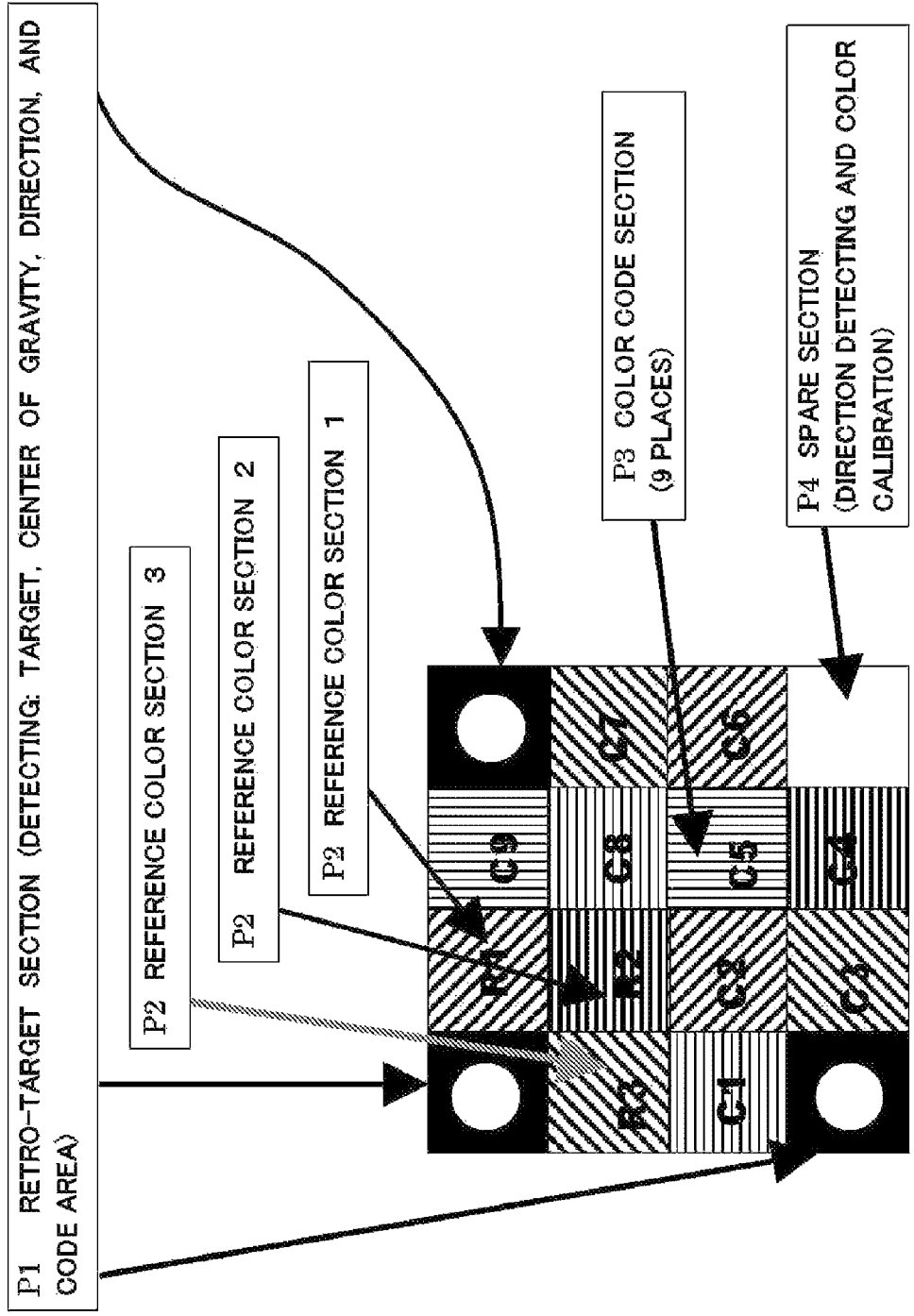
FIG. 13 shows an example of a color-coded target as the second embodiment of the invention.

FIG. 13 shows an example of a color-coded target CT2 as the second embodiment. In the color-coded target CT2 shown in FIG. 13, the color code section P3 is configured with 9 unit areas of a small square shape. In other words, a square color-coded target CT2 is divided into 16 pieces of 1/16 square with three vertical lines and three horizontal lines. The reference color section P2 is made with the same disposition as the color-coded target CT1, and the color-coded section is configured with 9 equal-sized 1/16 squares. The retro-target section P1 and the spare section P4 are the same as those of the color-coded target CT1. When the number of colors in this embodiment is made to be 9, the number of codes is the factorial of 9, or 362880, or the number of codes that can be expressed.

Figure 14:
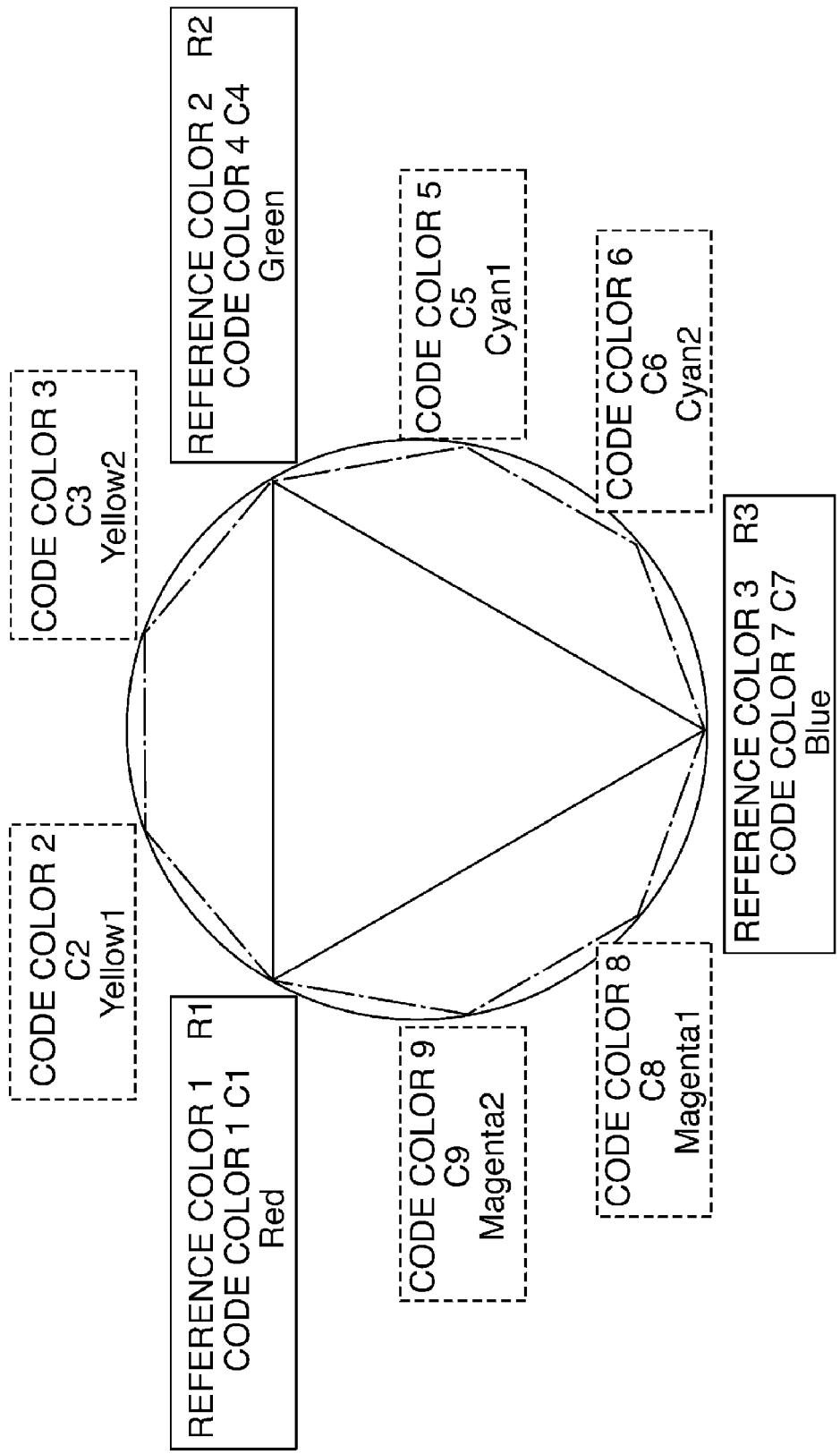
FIG. 14 shows the disposition of reference colors and colors of code color on a hue circle of the second embodiment.

FIG. 14 shows disposition of reference colors and code colors on the hue circle of the second embodiment. For example, colors in the unit areas R1-R3 of the reference color section are made red, green, and blue. Nine colors in the unit areas C1-C9 are configured with 3 reference colors plus 2 colors interposed at even intervals between the two adjacent reference colors: red, yellow 1 (red side), yellow 2 (green side), green, cyan 1 (green side), cyan 2 (blue side), blue, magenta 1 (blue side), and magenta 2 (red side). Intervals between hues of adjacent code colors are all even: 360°/(n=9)=40°.

Figure 15A:
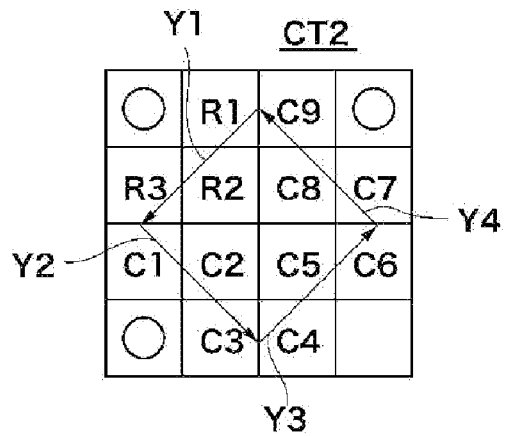
FIGS. 15A, 15B and 15C are drawings for explaining the detection of color disposition in the reference color section and the color code section of the second embodiment.
Figure 15B:
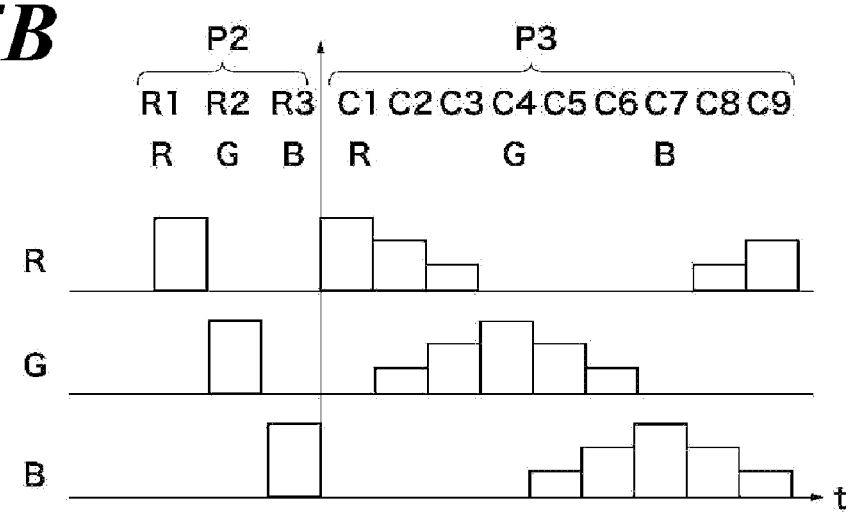
Figure 15C:
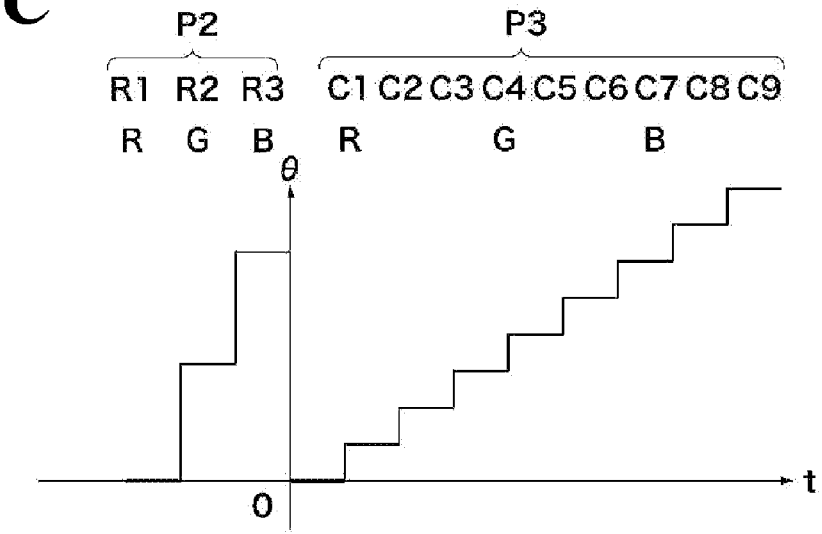

FIGS. 15A, 15B and 15C are drawings for explaining the detection of the color disposition in the reference color section P2 and the color code section P3 of the second embodiment. FIG. 15A shows an example of color disposition on the color-coded target CT2. Disposition is made in the way that unit areas may be scanned along the arrows Y1-Y4 in the order of R1-R3, and C1-C9. FIG. 15B shows light intensity of colors in the unit areas R1-R3, and C1-C9 expressed in the RGB color space. RGB components of the unit areas R1-R3, and C1-C9 are expressed by one or two components of the RGB coordinate system and divided into 9 patterns. FIG. 15C shows the colors of the unit areas R1-R3, and C1-C9 expressed in hue in the HSI color space. In the HSI color space, the colors of the unit areas R1-R3, and C1-C9 are expressed in hue that is θ, and divided into 9 angles. When the hues of the reference color section P2 and the color code section P3 of the color-coded targets CT2 shown in FIG. 15A are detected by scanning to traverse R1-R3 nearly evenly as shown with the arrow Y1 and to traverse C1-C3, C4-C6, and C7-C9 nearly evenly as shown with the arrows Y2-Y4, for the RGB color space, a time-wise or space-wise transition pattern of RGB light intensity moving from left to right in FIG. 15B is obtained; and for the HSI color space, a time-wise or space-wise transition pattern of hues θ moving from left to right in FIG. 15C is obtained. These transition patterns are common to all the color-coded targets CT2 of R1-R3; and, different for individually color-coded targets CT2 of C1-C9. The time-wise or space-wise transition patterns of hues θ detected for individually color-coded targets CT2 are stored in the target position and color disposition storing section 141. The range of hue deviation is preferably ±40/3° or less, more preferably ±40/6° or less, and further preferably ±40/12° or less. Otherwise, the process may be performed like the first embodiment.

Figure 16:
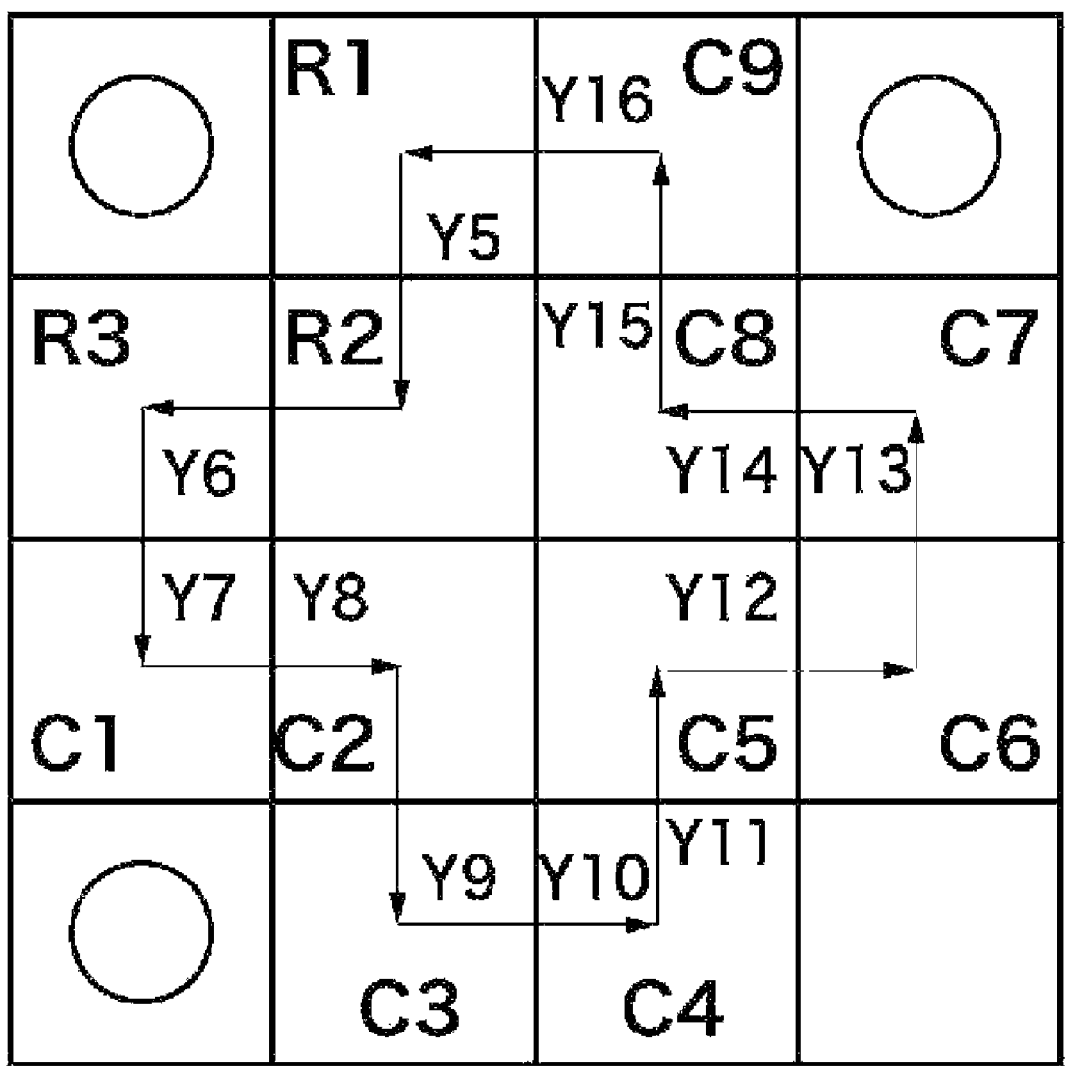
FIG. 16 shows another example of scanning for detecting hues.

FIG. 16 shows another example of scanning for detecting hues in the reference color section and color code section. The unit areas R1-R3, C1-C3, C4-C6, C7-C9 may be scanned across nearly evenly as shown with arrows Y5-Y16 as if tracing the circumference of the cross of a Red Cross flag. Therefore, in the HSI color space, a time-wise or space-wise transition pattern of hues θ like FIG. 15 C is obtained.

Third Embodiment

Figure 17:
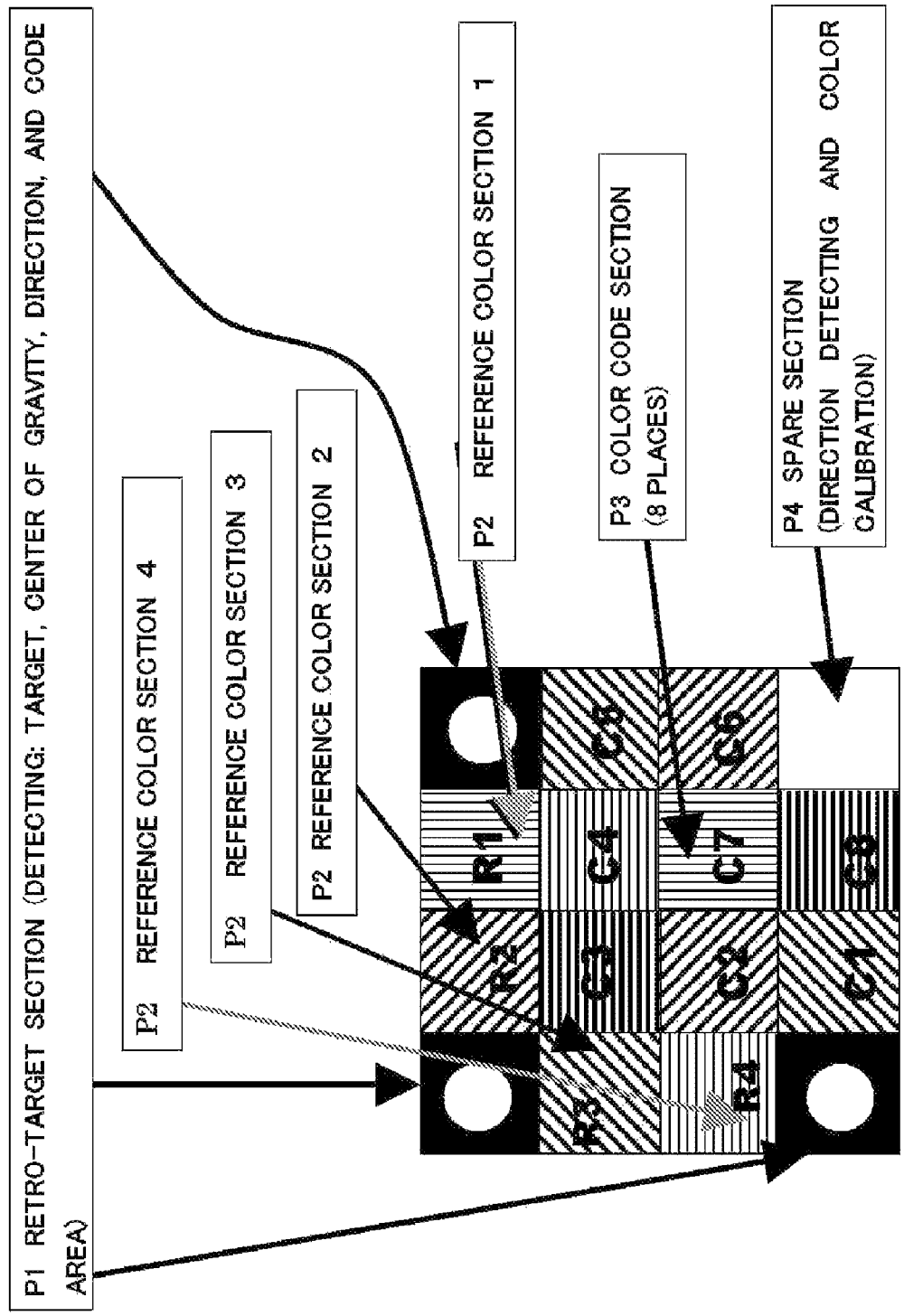
FIG. 17 shows an example of color-coded target of the third embodiment.

FIG. 17 shows an example of a color-coded target CT3 of the third embodiment; an example containing reference colors other than the three primaries of light. On the hue circle of code colors in the HSI color space, 4 reference colors (R1-R4), and 8 code colors including reference colors (C1-C8) are employed, with hues (angles) of adjacent code colors at even intervals. While the number and shapes of all the unit areas of both the reference color section P2 and the color code section P3 are the same as those in the second embodiment, the number of the unit areas of the reference color section P2 is 4 disposed in a space between two retro-targets P1; and the number of unit areas of the color code section P3 is 8 disposed in positions other than the position section of the retro-targets P1, the reference color code section P2, and the spare section P4.

Figure 18:
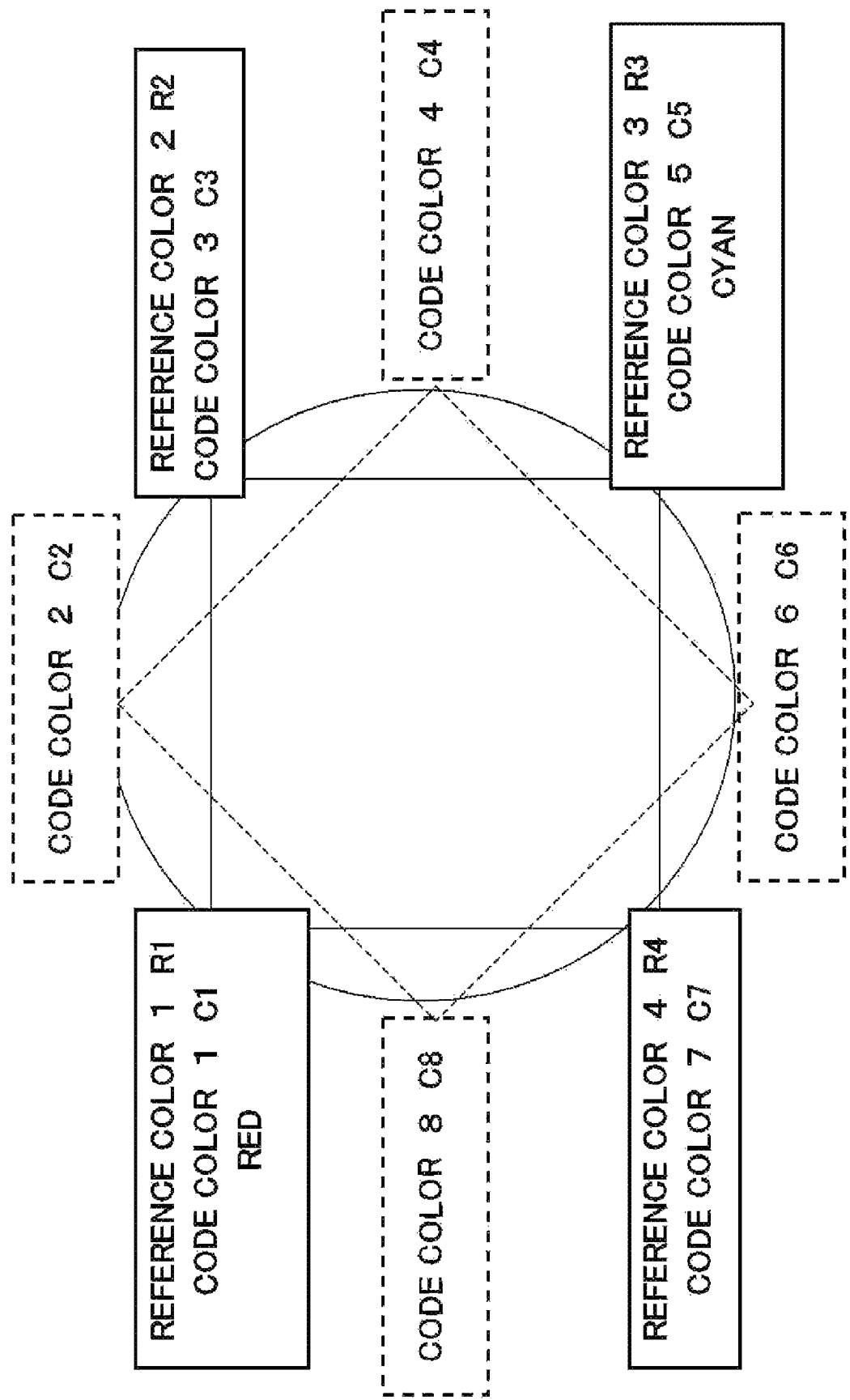
FIG. 18 shows the disposition of reference colors and colors of code color on a hue circle of the third embodiment.

FIG. 18 shows the disposition of reference colors and code colors on the hue circle of the third embodiment. On the hue circle in the HSI color space, 4 reference colors and 8 code colors are employed. For example, the hues (angles) of the reference colors are: R1 ($\theta_{11}$=0°, red), R2 ($\theta_{13}$=90°), R3 ($\theta_{15}$=180°, cyan), and R4 ($\theta_{17}$=270°); and the hues (angles) of the code colors are: C1 ($\theta_{11}$=0°, red), C2 ($\theta_{12}$=45°), C3 ($\theta_{13}$=90°), C4 ($\theta_{14}$=135°), C5 ($\theta_{18}$=180°, cyan), C6 ($\theta_{16}$=225°), C7 ($\theta_{17}$=270°), and C8 ($\theta_{18}$=315°). All the intervals between adjacent hues (angles) of code colors are even at 360°/(n=8)=45°. Scanning for determining codes is performed for example like the second embodiment. Color correction is made first to reference color deviations $\delta\theta_{11}$, $\delta\theta_{13}$, $\delta\theta_{15}$, and $\delta\theta_{17}$. For the intermediate code colors, for example for $\delta\theta_{12}$, $(\delta\theta_{11}+\delta\theta_{13})/2$ is subtracted. The range of hue deviation is preferably ±15° or less, more preferably ±7.5° or less, and further preferably ±3.75° or less.

Fourth Embodiment

Figure 19:
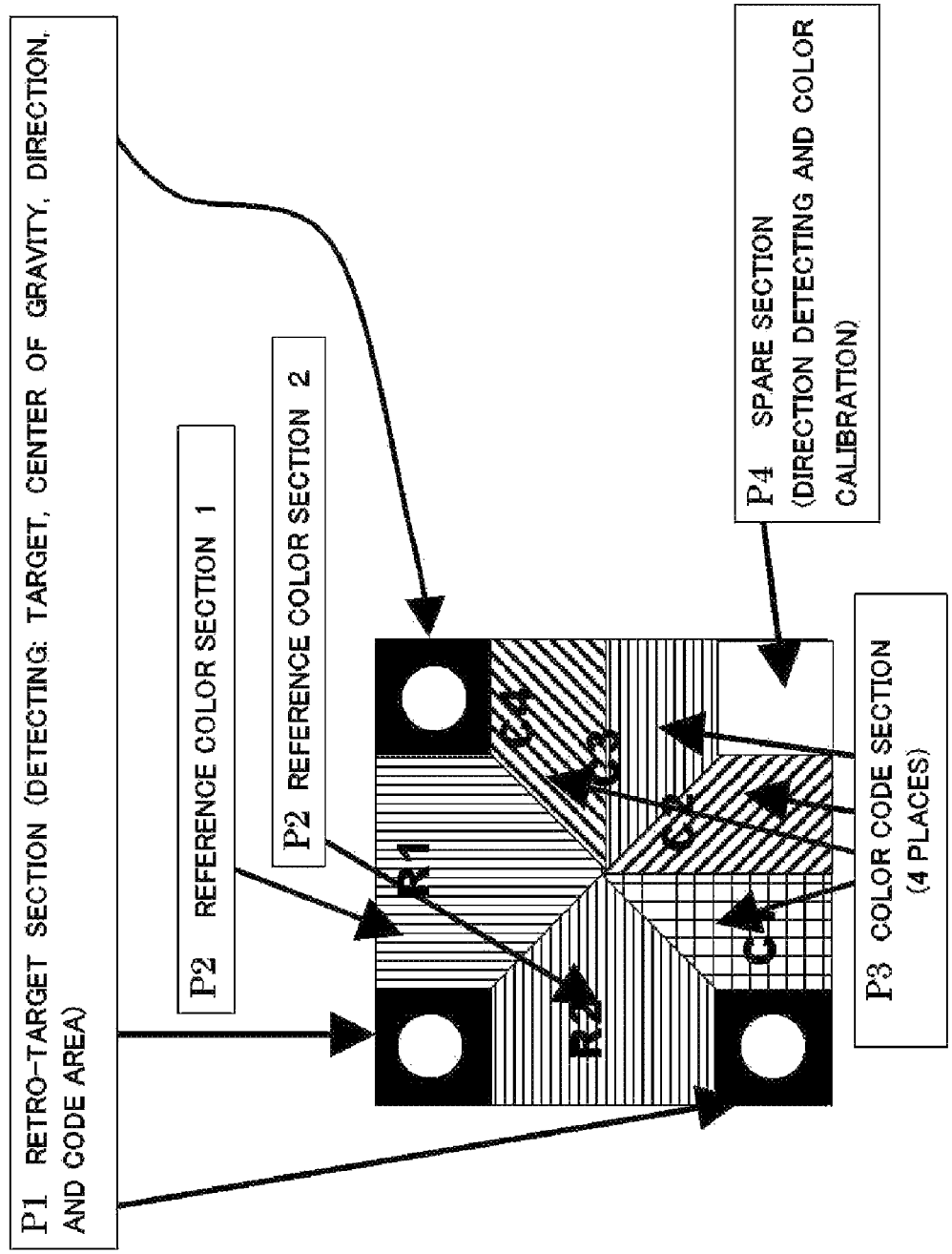
FIG. 19 shows an example of color-coded target of the fourth embodiment.

FIG. 19 shows an example of color-coded target CT4 of the fourth embodiment. The number of reference colors is made to be 2 (R1 and R2), and the number of code colors is made to be 4 (C1-C4) including the reference colors. In this example, hues (angles) of adjacent code colors are disposed at even intervals. The color-coded target CT4 is divided into two; an upper left portion and a lower right portion. Each portion, excluding the retro-target section P1 and the spare section P4, is made to be a reference color section P2 and a code color section P3. In the case a condition is given that the number of colors used is 4, or 2 reference colors plus intermediate colors between the two adjacent reference colors, 24 (4×3×2×1) kinds of codes may be expressed. In this embodiment, the reference color area R2 of the color-coded target CT1 is divided into two with a straight line interconnecting the center of the CT1 and the lower right apex of the retro-target section P1. One of the divided parts is united with R1 and C6 of CT1 to form R1 of CT4; the other part is united with R3 and C1 of CT1 to form R2 of CT4. Further, C2 of CT1 is made to be C1 in CT4, C3 of CT1 is made to be C2 in CT4, C4 of CT1 is made to be C3 in CT4, and C5 of CT1 is made to be C4 in CT4.

Figure 20:
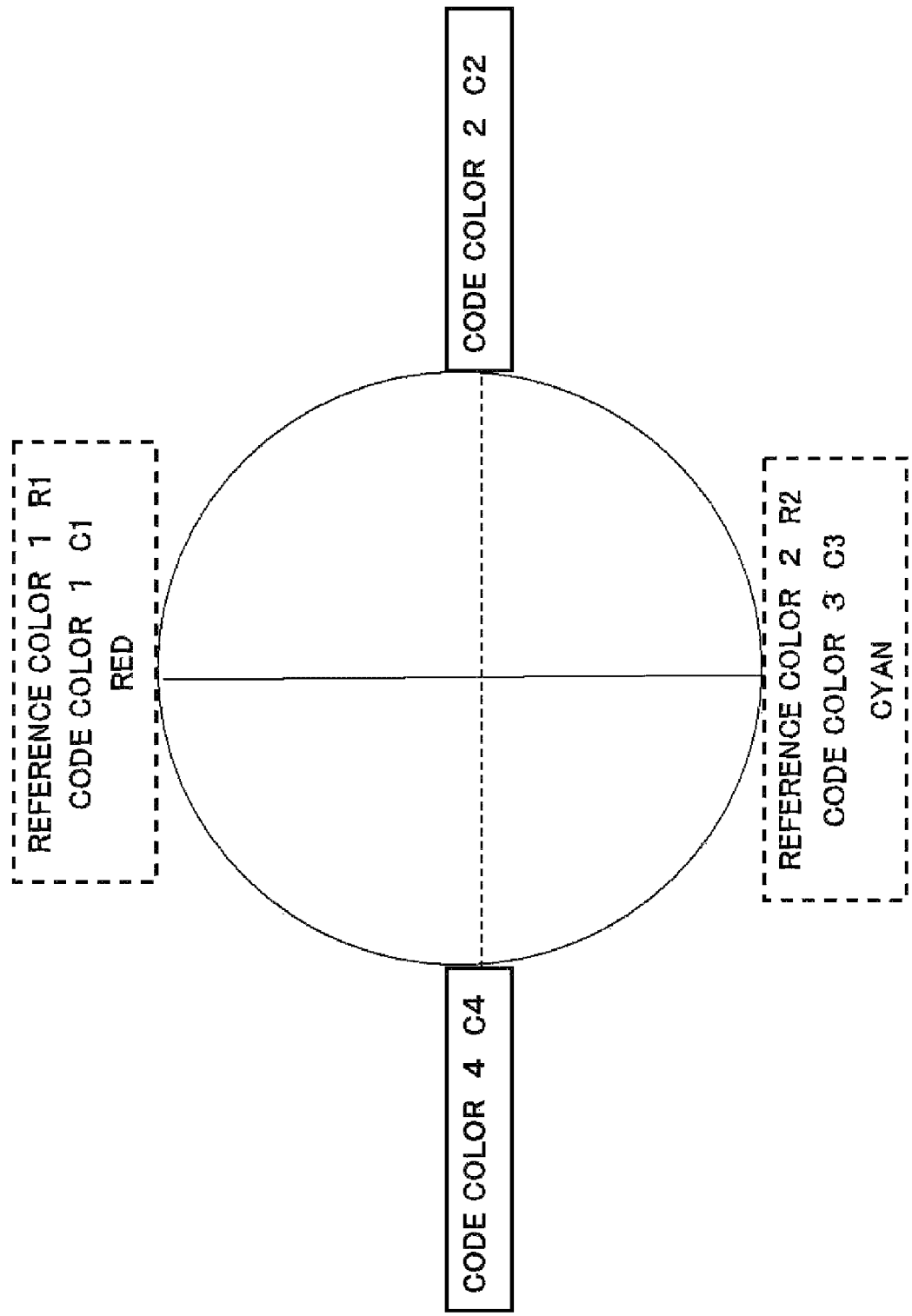
FIG. 20 shows the disposition of reference colors and colors of code color on a hue circle of the fourth embodiment.

FIG. 20 shows the disposition on the hue circle of reference colors and code colors of the fourth embodiment. The number of reference colors on the hue circle in the HSI color space is made to be two; and the number of code colors is made to be four. For example, the hues (angles) of the reference colors are: R1 ($\theta_{21}=0°$, red), and R2 ($\theta_{23}=180°$, cyan), and the hues (angles) of the code colors are: C1 ($\theta_{21}=0°$, red), C2 ($\theta_{22}=90°$), C3 ($\theta_{23}=180°$, cyan), and C4 ($\theta_{24}=270°$). Intervals between hues (angles) of adjacent code colors are all even: $360°/(n=4)=90°$. Scanning for determining codes is performed like that of for example the first embodiment. Color correction is made first to reference color deviations $\delta\theta_{21}$ and $\delta\theta_{23}$. For the intermediate code colors, for example for $\delta\theta_{22}$, $(\delta\theta_{21}+\delta\theta_{23})/2$ is subtracted. The range of hue deviation is preferably ±30° or less, more preferably ±15° or less, and further preferably ±7.5° or less.

Fifth Embodiment

Figure 21:
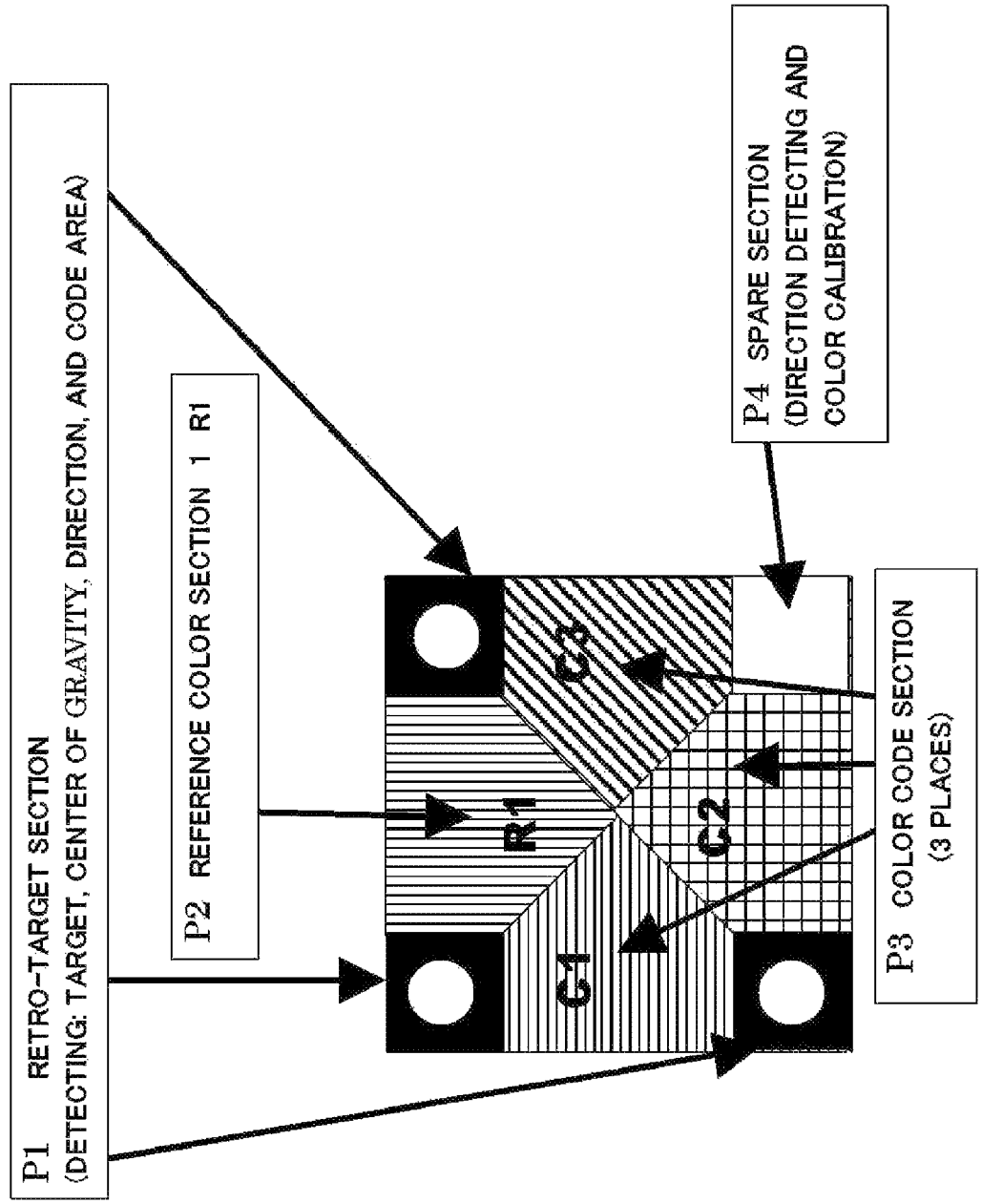
FIG. 21 shows an example of color-coded target of the fifth embodiment.

FIG. 21 shows an example of a color-coded target CT5 of the fifth embodiment. This example has one reference color (R1) and the number of code colors is three (C1-C3) including the reference color, and hues (angles) of adjacent code colors are disposed at even intervals. The color-coded target CT5 is divided into four portions: upper, right, lower, and left portions. The upper portion other than the retro-target section P1 is used as the reference color section P2, and the other portions excluding the retro-target section P1 and the spare section P4 are used as a color code section P3. Using the single reference color and two more colors, three in total, makes it possible to express 27 ($3^3$) kinds of codes. Here, R2 of CT4 is made to be C1, C1 and C2 united together are made to be C2, and C3 and C4 united together are made to be C3.

Figure 22:
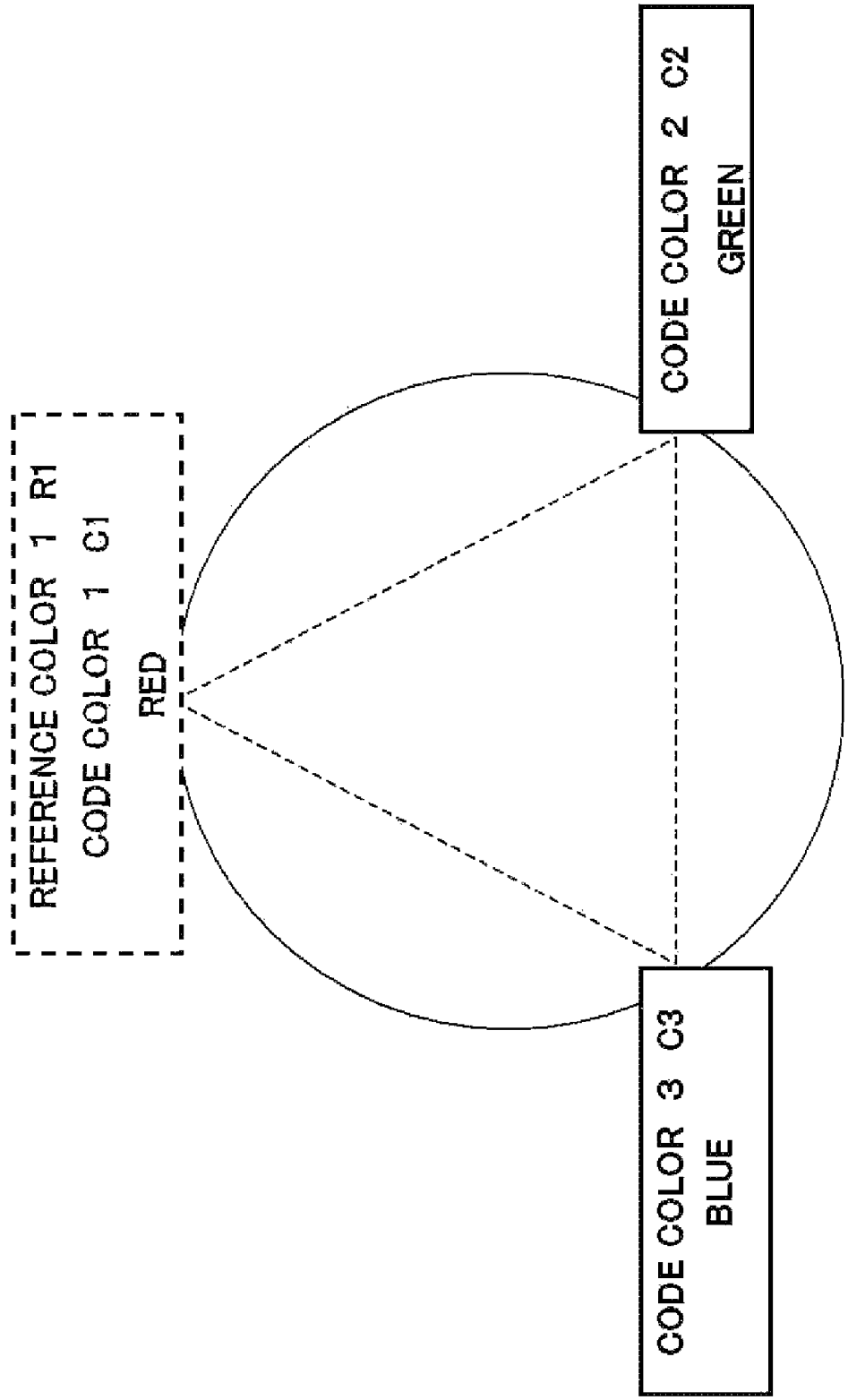
FIG. 22 shows the disposition of reference colors and colors of code color on a hue circle of the fifth embodiment.

FIG. 22 shows the disposition of reference color and code colors on the hue circle of the fifth embodiment. On the hue circle of the code colors in the HSI color space, one reference color and three code colors are used. In other words, the hue (angle) of the reference color is made to be R1 ($\theta_{31}=0°$, red), and the hues (angles) of code colors are made to be C1 ($\theta_{31}=0°$, red), C2 ($\theta_{32}=120°$, green), and C3 ($\theta_{33}=240°$, blue). The intervals between hues (angles) of adjacent code colors are all even at $360°/(n=3)=120°$. Scanning for determining codes is performed for example like the first embodiment. To correct colors, first the deviation $\delta\theta_{31}$ of the reference color is corrected. As for intermediate code colors, for example $\delta\theta_{31}$ is evenly subtracted. The range of hue deviation is preferably ±40° or less, more preferably ±20° or less, further more preferably ±10° or less.

Sixth Embodiment

The first to fifth embodiments are described as examples in which pure red, green, blue, etc. are used as reference colors and code colors. The sixth embodiment is described as a case in which those reference colors and code colors are evenly shifted and used.

Using the hue circle of FIG. 2 of the first embodiment as a base, the hues of reference colors and code colors are evenly increased by $\Delta\theta$ (for example 5°) Even with such a modification, as the adjacent colors in the HSI color space of the color code pattern are disposed at even intervals, colors are easy to determine and reading errors are unlikely to occur. The same holds true even if the $\Delta\theta$ (for example 5°) is evenly subtracted from the hues of the reference colors and code colors, and the same also applies to the second to fifth embodiments.

Seventh Embodiment

Figure 23:
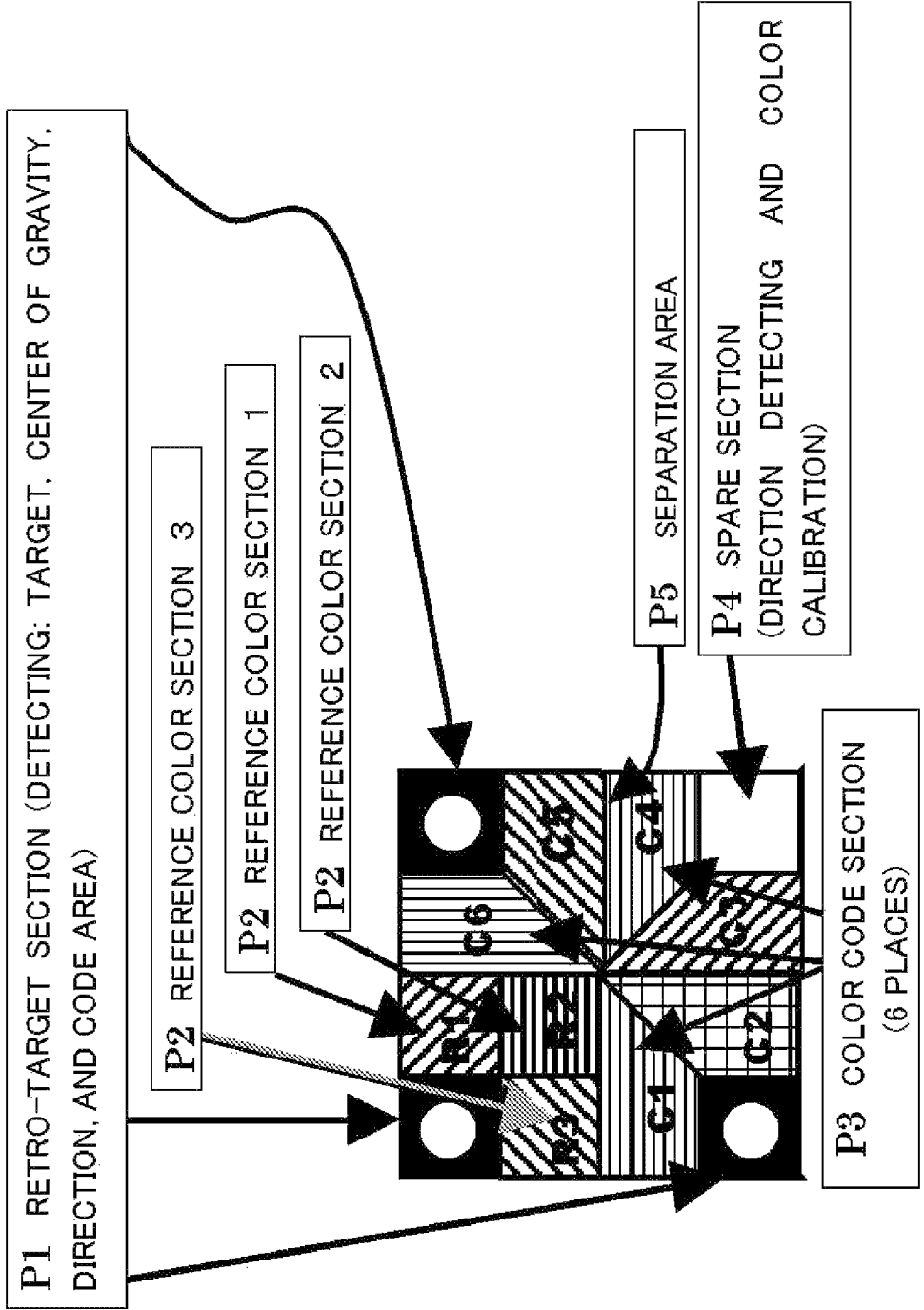
FIG. 23 shows an example of color-coded target of the seventh embodiment.

FIG. 23 shows an example of the color-coded target CT6 of the seventh embodiment. The color-coded target CT6 shown in FIG. 23 is made by modifying the color-coded target CT1 shown in FIG. 1 by interposing a black separation area P5 between unit areas of the retro-target section P1, reference color section P2, color code section P3, and spare section P4. This makes borders between unit areas clear and reduces errors in determining unit area zones and colors.

Eighth Embodiment

While the above embodiments are described as examples in which reference colors and code colors in the HSI color space are chosen to be disposed at even intervals, the seventh embodiment is described as a case in which hue intervals are uneven.

Figure 24:
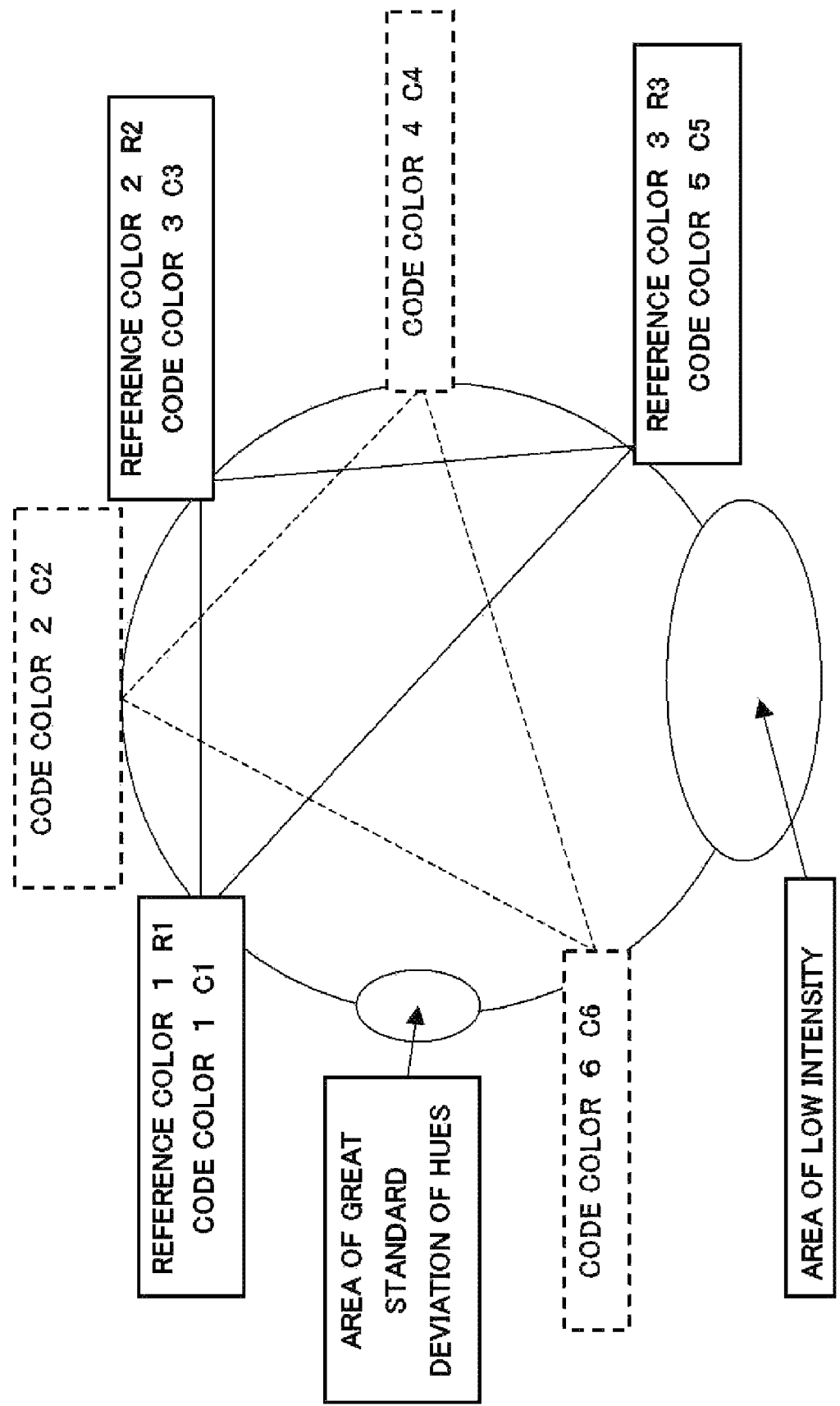
FIG. 24 is a drawing for explaining a hue circle where parts of the hues are removed in the HSI color space.

FIG. 24 is a drawing for explaining a hue circle with part of hues removed in the HSI color space. For example, because of limitation to color reproduction range by a printing device, there are cases in which intensity is low or standard deviation of hues is great (colors are unstable), so that accuracy of discriminating adjacent colors is low. Therefore, it is possible to improve the hue discrimination accuracy by excluding colors of low intensity and colors of great standard deviation of hues and using the rest of colors. For example in the HSI color space, when blue-based or purple-based colors are lower in hue intensity than in other parts and the sensitivity of detection system is poor, there is a possibility of color detection errors in comparison with other parts. In addition, as magenta-based colors have a discontinuous portion in wavelength, there is a possibility of instability.

Figure 25:
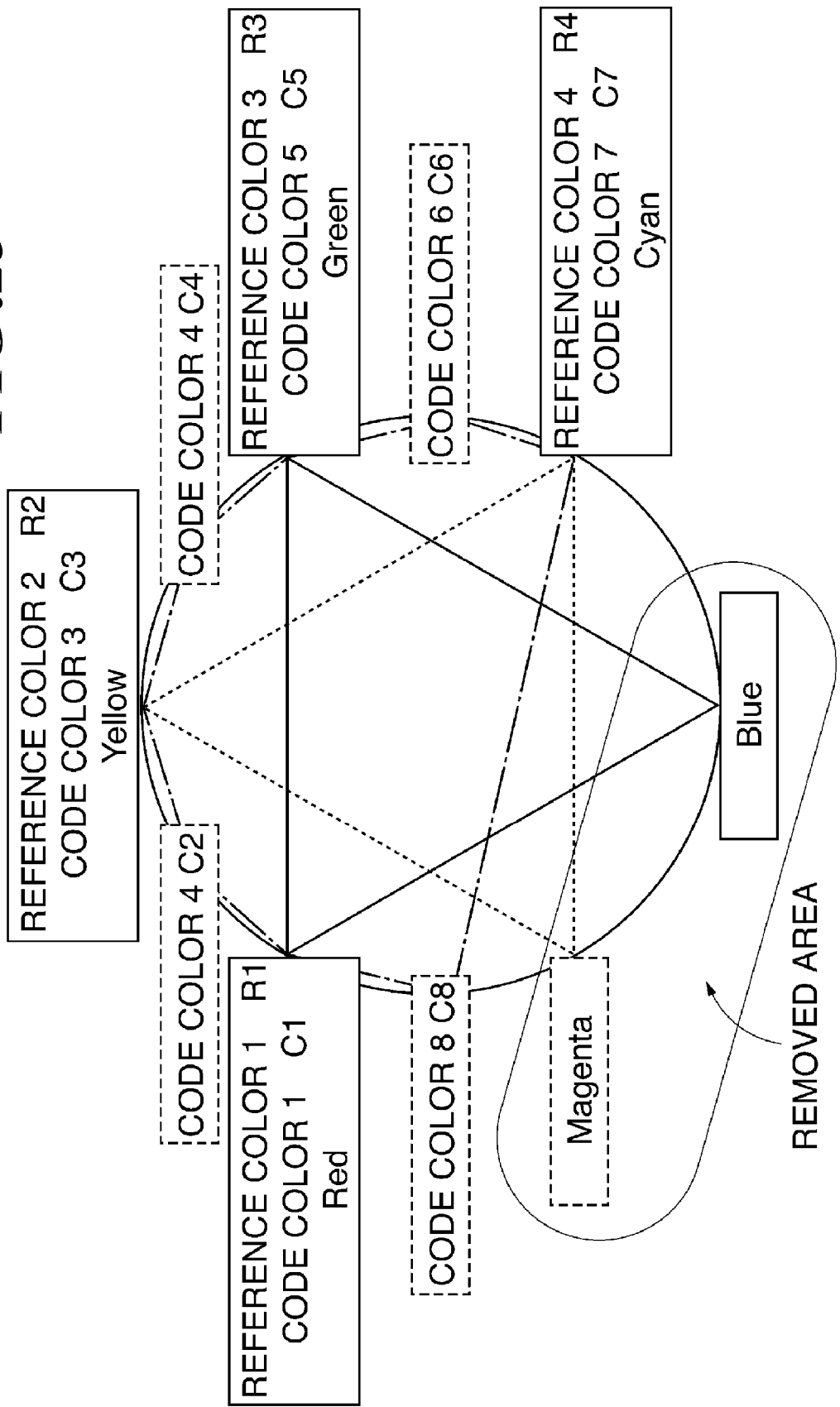
FIG. 25 is a drawing for explaining the disposition of reference colors and colors of code color on the hue circle of the eighth embodiment.

FIG. 25 shows the disposition of reference colors and code colors on the hue circle of the eighth embodiment. Blue-based part and magenta-based part are removed from the hue circle of FIG. 2. The number of reference colors is made to be four and the number of code colors is made to be eight including the reference colors. The hue intervals between adjacent code colors are made even.

Figure 26:
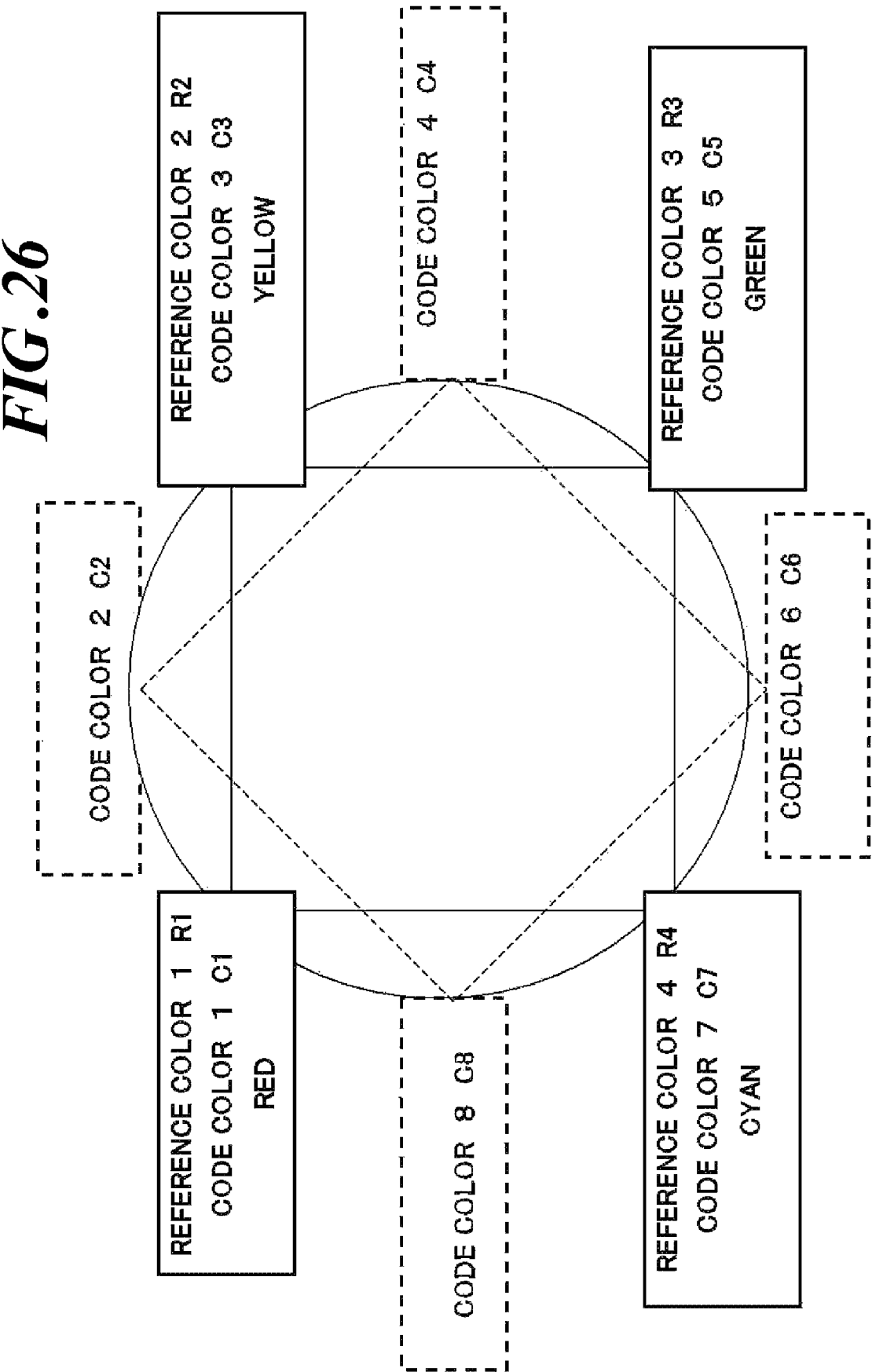
FIG. 26 shows a disposition of reference color and code color on a quasi hue circle formed removing part of the hues.

FIG. 26 shows the disposition of reference colors and code colors on the quasi hue circle formed excluding part of the hues. On the quasi hue circle in the HSI color space, the number of reference colors is made to be four, and the number of code colors is made to be eight. For example, the reference color hues (angles) are $\theta_{11}=0°$ (red), $\theta_{13}=90°$ (yellow), $\theta_{15}=180°$ (green), $\theta_{17}=270°$ (cyan); and the code color hues (angles) are $\theta_{11}=0°$ (red), $\theta_{12}=45°$, $\theta_{13}=90°$ (yellow), $\theta_{14}=135°$, $\theta_{15}=180°$ (green), $\theta_{16}=225°$, $\theta_{17}=270°$ (cyan), and $\theta_{18}=315°$. Intervals between adjacent code color hues (angles) are made even to be $360°/(n=8)=45°$. Disposition of the reference section P2 and the color code section P3 and scanning are similar to those in the second embodiment. The deviation range on the quasi hue circle is preferably ±15° or less, more preferably ±7.5° or less, and further more preferably ±3.75° or less.

Ninth Embodiment

While the eighth embodiment is described as an example in which the blue-based part and the magenta-based part are removed from the hue circle in the HSI color space, the ninth embodiment is described as an example in which a quasi HSI color space is constituted by removing part of hues in each area between adjacent code colors from the HSI color space. Difference between adjacent code colors may be made clear.

Figure 27:
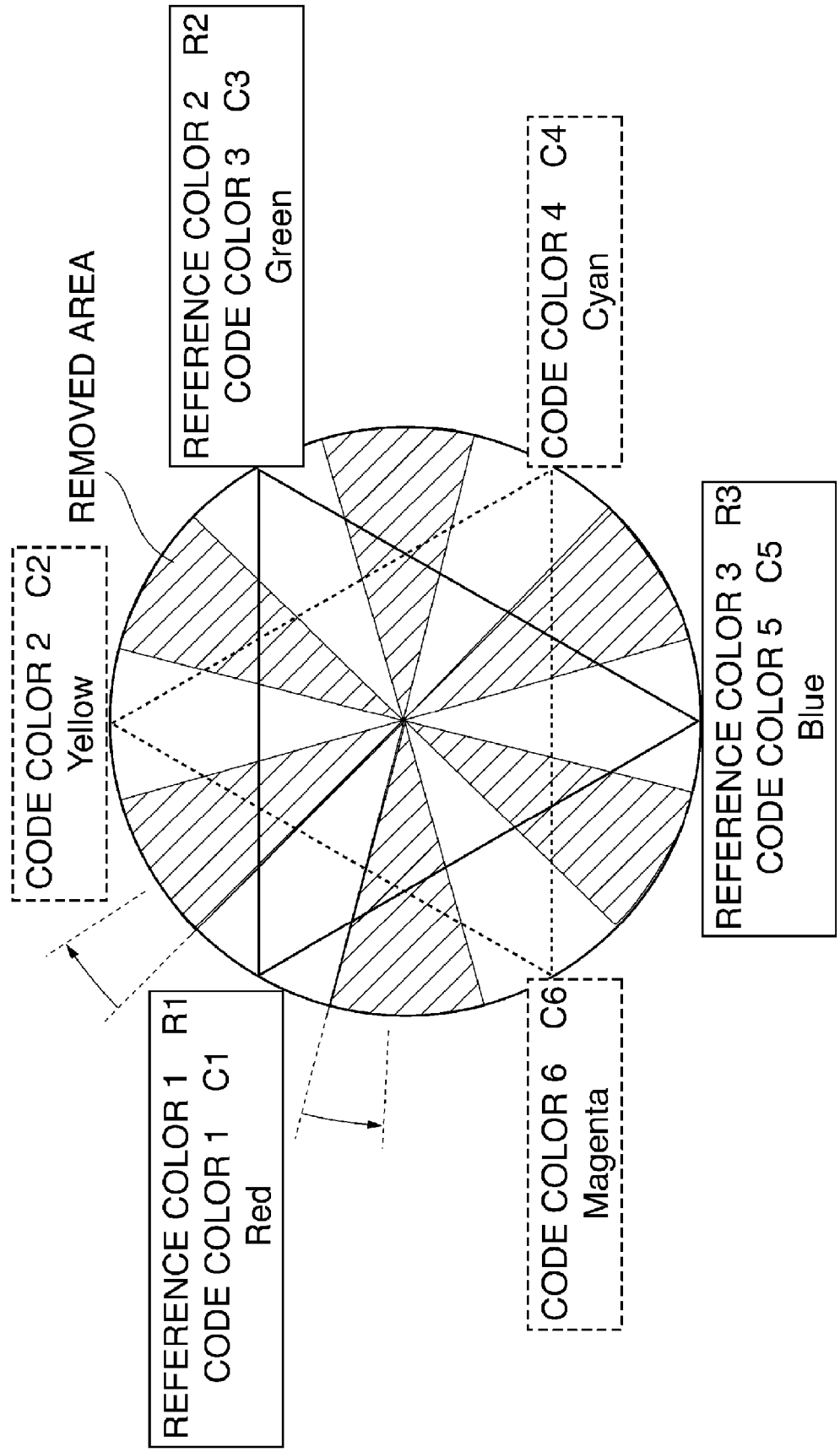
FIG. 27 is a drawing for explaining the disposition of reference colors and colors of code color on the hue circle of the ninth embodiment.

FIG. 27 is a drawing for explaining the disposition of reference colors and code colors on the hue circle of this embodiment. A quasi HSI color space is formed with part of hues removed from each of the intermediate areas between adjacent code colors. This is an example in which the total area (hatched in the drawing) from which hues are removed is 50%. The angle of the code color angle is doubled. As a result, difference between adjacent code colors becomes clear and the possibility of color detection error lowers.

10th Embodiment

While the above embodiments are described as examples in which color codes are expressed using hues as variables, the 10th example is described as one in which saturation or intensity, other than hue, are used as variables. As for yellow for example; yellow, brown, and dark brown may be discriminated even visually by intensity; and brown and grayish brown may be discriminated by saturation. When the HSI color space is discriminated with a computer, more degrees may be discriminated. Also for example, it is possible to employ a color of high intensity as a reference color and classify the code color into 5 or 6 colors of high to low intensities; and employ a color of high saturation as a reference color and classify the code color into 2 or 3 colors of high to low saturations. While the above embodiments are described as examples in which up to 9 hues may be discriminated, more colors may be discriminated utilizing the ability of the computer. Moreover, if color codes are constituted by combining hue, saturation, and intensity, the number of color codes that can be discriminated may be greatly increased.

11th Embodiment

While the first embodiment is described as an example in which the color code extracting device converts the colors of photographed images obtained in the RGB color space through the RGB filter or the like of the CCD camera into the HSI color space, the 11th embodiment is described as one in which a light receiving apparatus detects wavelengths of light reflected from color-coded targets CT applied to various parts of a measured object and, on the basis of the detected light wavelengths, converts them into hues in the HSI color space to obtain HSI image data.

When the reflected light is of a single color, as the light wavelength corresponds to a hue in the HSI color space in one-to-one relationship, it is possible for example to store a table of correspondence between wavelength and hue, and make conversion on the basis of the correspondence table. However, as the colors of the reference color section P2 and the color code section P3 are applied by printing, there are cases in which the reflected light exhibits a plurality of wavelengths and spectrum. In such cases for example, it is possible that the correspondence table stores the corresponding relationship between the reflected light spectra of the color codes and hues in the HSI color space, and determine hues on the basis of the corresponding relationship. It is also possible to measure hues directly with a color brightness meter and use the measurements as hues in the HSI color space.

12th Embodiment

When the measured object has a great surface area, a plurality of photographed images are joined together to make three-dimensional measurements. The 12th example is described as one in which a plurality of stereo images are joined together to make measurements.

Figure 28A:
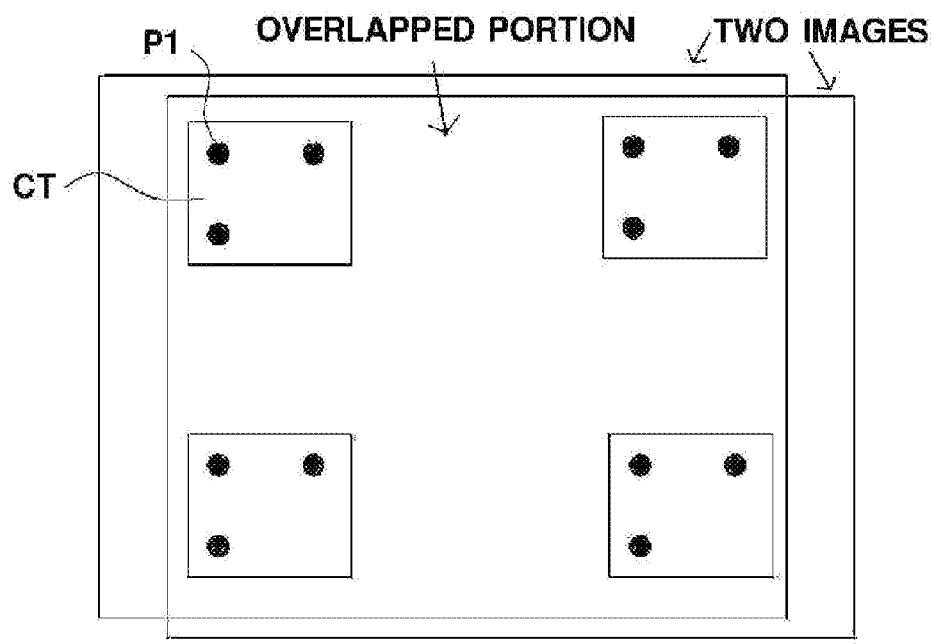
FIGS. 28A and 28B show example images photographed as overlapped.
Figure 28B:
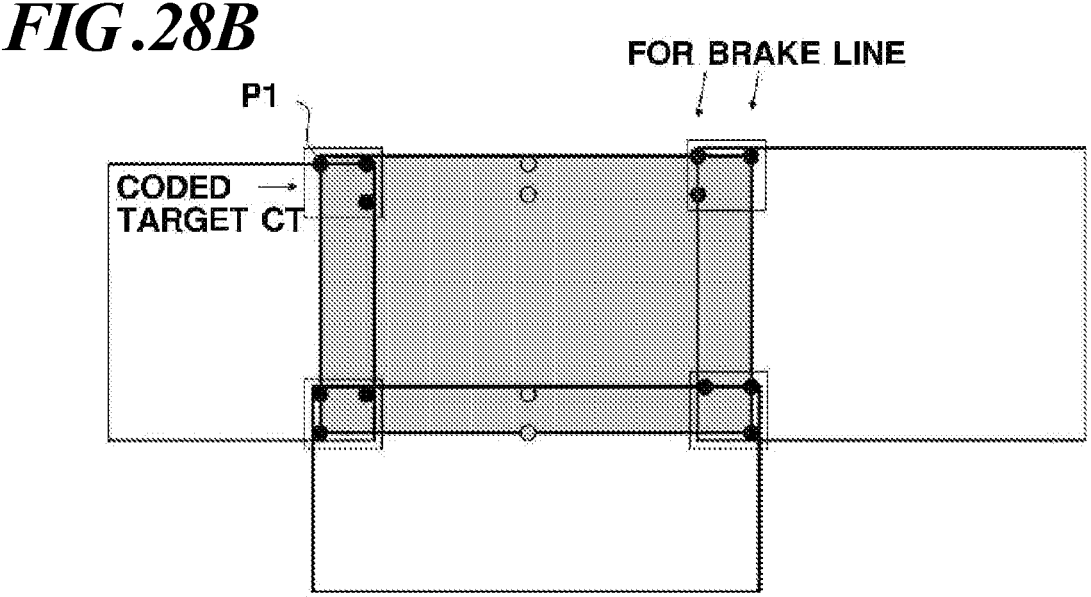

FIG. 28 shows an example of photographed images taken to overlap each other using right and left stereo cameras. FIG. 28A shows how the stereo images overlap each other. A basic range to be measured is the overlapped range of the two (a pair of) stereo photographed images. At this time, photographing that includes 4 coded targets CT within the overlapped range makes it possible to make three-dimensional measurements using the stereo images of the area including the 4 coded targets CT. FIG. 28B shows how to overlap adjacent stereo images each other. When a series of images are photographed to overlap each other so as to include 2 coded targets CT in upper, lower, right, or left side as shown in the drawing, it is possible to automate non-contacting three-dimensional measurement over a wide range by joining together a series of images. The disposition of a series of images is determined with the disposing section 47 and stored in the target information storing section 150. Incidentally, this technique may also be applied to the first embodiment.

13th Embodiment

While the above embodiments are described as examples in which color-coded targets are applied to the measured object, the 13th embodiment is described as an example in which a projector 12 projects a color-coded pattern onto the measured object 1 in place of applying the color-coded targets CT.

Figure 29:
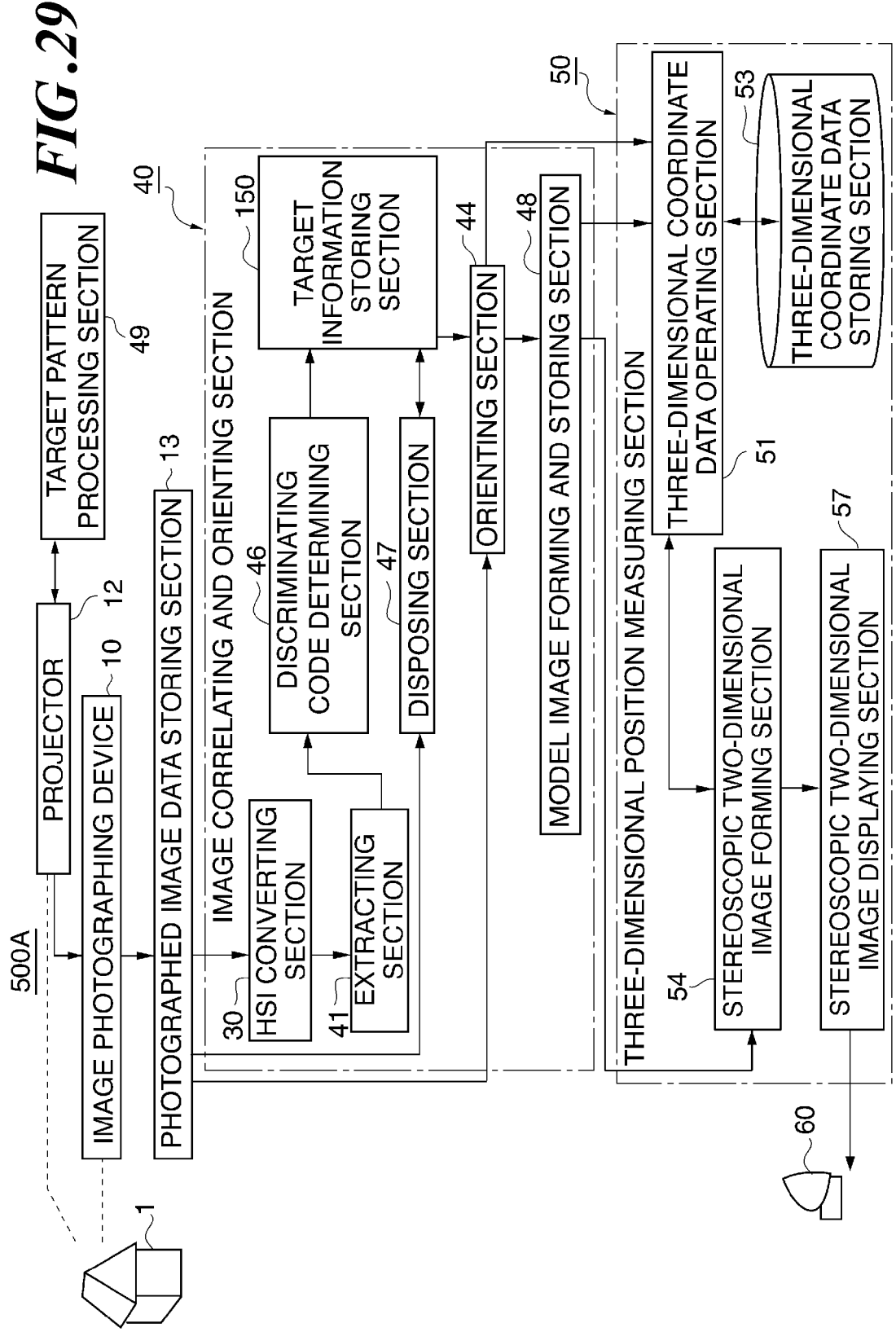
FIG. 29 is a block diagram of an example of an overall constitution of a three-dimensional measuring system of the 13th Embodiment.

FIG. 29 shows an overall constitution block diagram of a three-dimensional measuring system 500A of the 12th embodiment. In comparison with the three-dimensional measuring system 500 of the first embodiment (refer to FIG. 8), a projector 12 and a target pattern processing section 49 are added, the other constitution remains the same as that of the first embodiment. Various patterns such as those for detecting positions are projected with the projector 12 onto the measured object 1, photographed with the photographing device 10, and used for orientation and three-dimensional measurement. The target pattern processing section 49 receives image data to detect various patterns, and also produces various patterns to be projected from the projector 12.

FIG. 29 shows an image photographing device 10 or a stereo camera, a projecting device (projector) 12, and the target pattern processing section 49. The target pattern processing section 49 as shown in FIG. 30A comprises: a pattern detecting section 491 for receiving photographed images from the image photographing device 10 and for detecting feature points of the measured object 1 or patterns such as projected targets; a pattern forming section 492 for forming projection patterns such as reference patterns, reference points, and wire frame patterns; and a pattern projecting section 493 for projecting the projection patterns formed with the pattern forming section 492 through the projector 12.

Figure 30A:
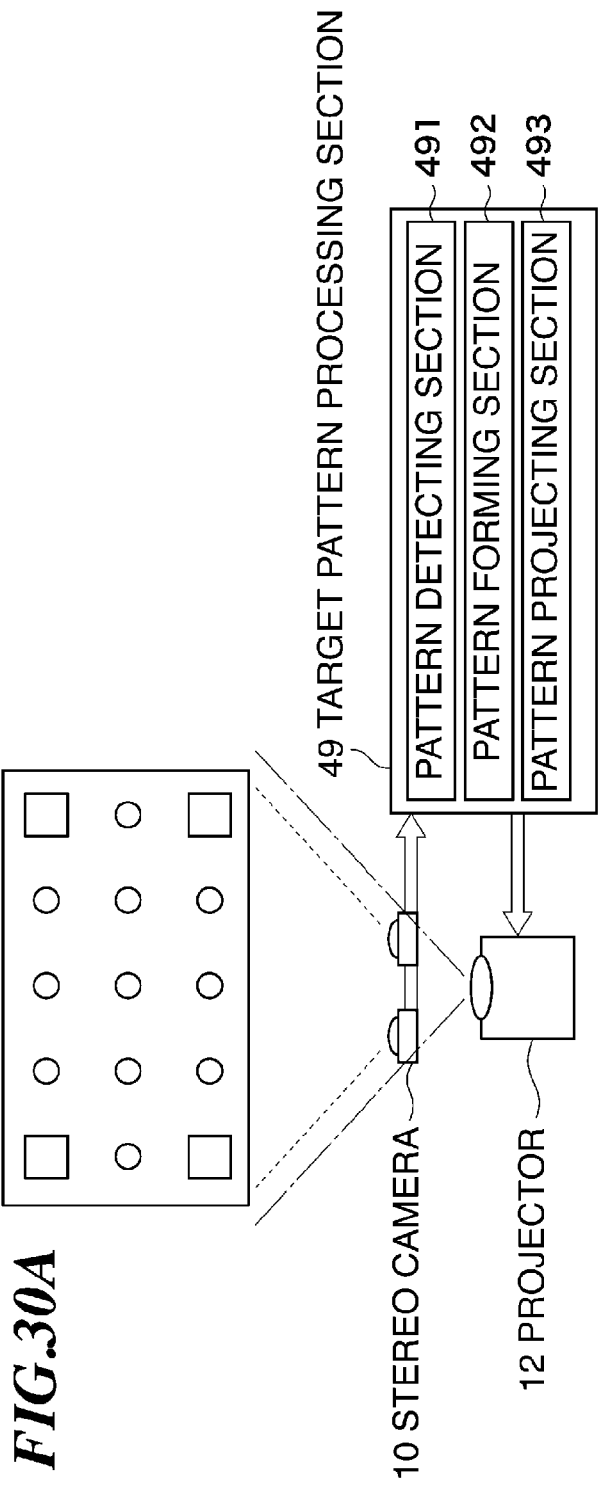
FIGS. 30A, 30B and 30C show an example of a reference pattern projected on a photographed object.
Figure 30C:
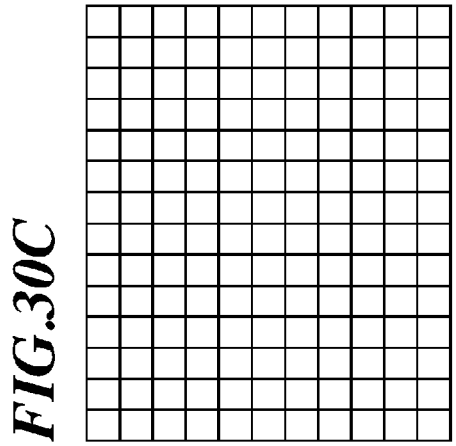
Figure 30B:
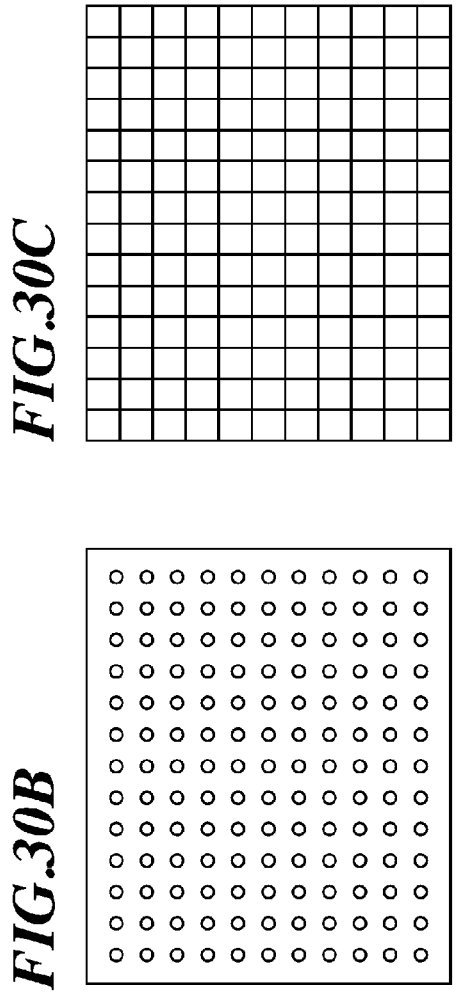

FIGS. 30A, 30B and 30C show examples of reference patterns to be projected onto the measured object 1. FIG. 30B shows a dotted pattern, and FIG. 30C shows a lattice pattern. The lattice is formed with vertical and lateral lines intersecting at right angles each other at even intervals. The dots are disposed at positions corresponding to the intersections of the lattice lines. FIG. 30A shows an example in which the reference pattern of FIG. 30B is projected on the measured object 1. In this embodiment, for example color-coded target patterns are disposed in the positions of dots or lattice intersections at vertical intervals of 2 dots and at lateral intervals of 4 dots, and targets serving as position detecting patterns for reference are disposed in the other dot positions, and projected on the measured object 1. Incidentally, a random pattern with dots or mesh disposed at random may be used in place of the reference pattern.

It is also possible to fully automate the above process. In that case, the targets are not applied but all of the measurements are performed only with the patterns projected by the projector. The system constitution, except the projector 12 and the target pattern processing section 49, and the process, except for disposing the color-coded targets, are similar to those of the first embodiment.

14th Embodiment

While the above embodiments are described as examples in which color-coded targets only are used as targets to perform orientation and three-dimensional measurement, the 14th embodiment is described as an example in which both color-coded targets and retro-targets are used to perform orientation and three-dimensional measurement. For example, main points are measured using color-coded targets; in the case more detailed three-dimensional coordinates using a number of points are required, retro-targets are disposed at such points and measured. Aspects that are different from the first embodiment will be described below.

FIG. 31 shows a block diagram of an overall constitution example of a three-dimensional measuring system 500B of this embodiment. In comparison with the three-dimensional measuring system 500 of the first embodiment (refer to FIG. 8), a reference point setting section 42, a corresponding point searching section 43, and a corresponding point indicating section 45 are added to the image correlating and orienting section 40. As feature points, color-coded targets and retro-targets applied to the measured object 1 are used. As for the color-coded targets, corresponding points may be determined even if they are not searched. As for retro-targets, the reference point setting section 42 searches a point present near a point specified on one of stereo images (reference image) and matching a feature point, and sets the point, matching the feature point, as a reference point. The corresponding point searching section 43 determines a corresponding point that corresponds to the reference point set with the reference point setting section 42 on the other (searched image) of the stereo images. The corresponding point indicating section 45, when an operator indicates a point near the feature point of the reference image, determines a reference point on the reference image and a corresponding point on the searched image. Thus, reference point and corresponding point are determined also for the retro-target to make orientation possible. For the retro-target, three-dimensional measurement is possible by stereo matching by using the reference point setting section 42, the corresponding point searching section 43, and the corresponding point indicating section 45. In this case too, it is possible to determine position coordinates of the retro-target on the basis of the position coordinates of the color-coded targets. Presence of a large number of retro-targets makes it possible to obtain detailed three-dimensional measurements.

Figure 32:
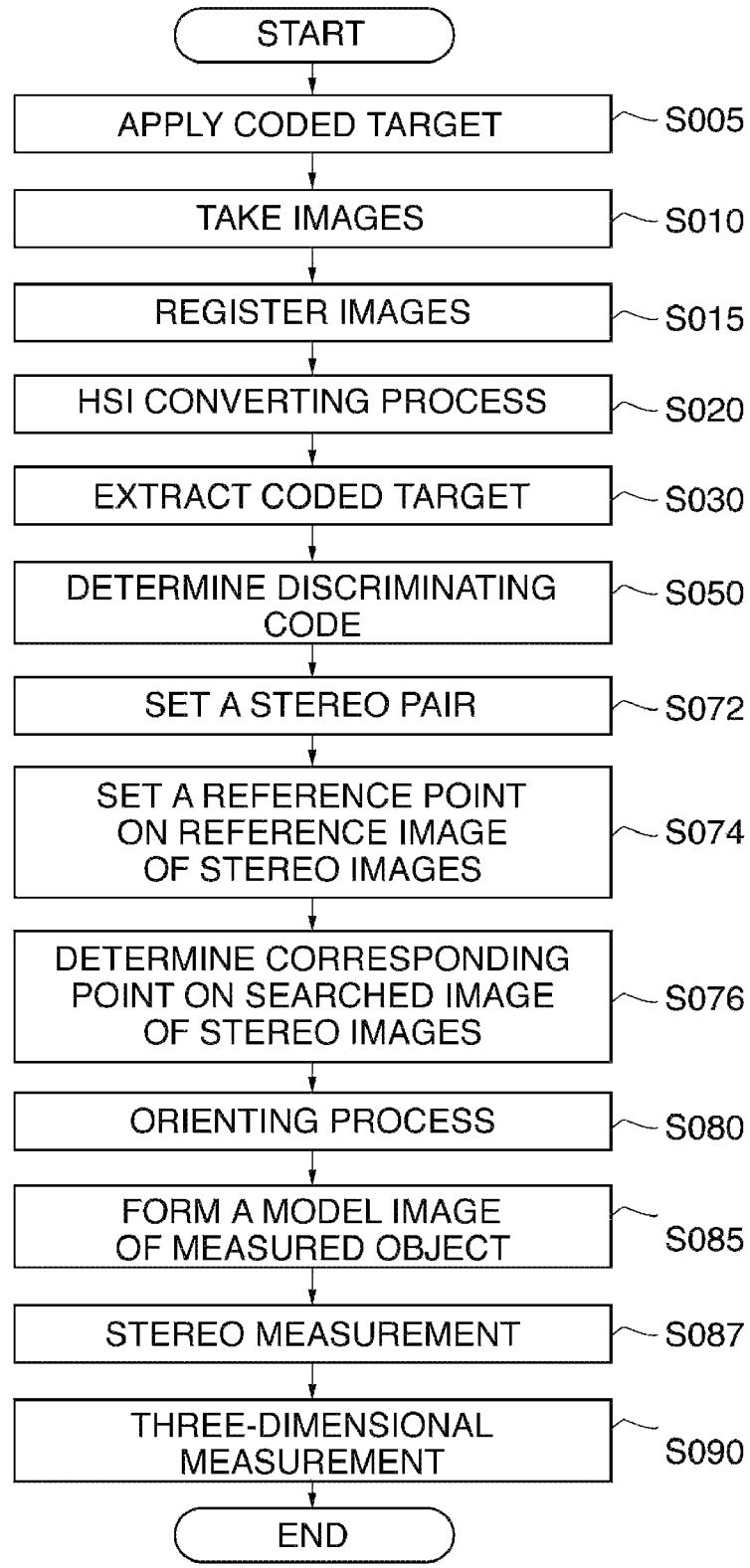
FIG. 32 shows an example flowchart for explaining the action of the three-dimensional measuring system of the 14th embodiment.

FIG. 32 shows an example flowchart for explaining the action of a three-dimensional measuring system of this embodiment. Up to the step of determining the discriminating code (S050), because the process is the same as the flowchart shown in FIG. 9, explanation is abridged. After determining the discriminating code, the process moves on to the step of setting a stereo pair. The extracting section 41 extracts a pair of images in which the color-coded targets CT having the same discriminating code are similarly disposed, and sets right and left images to be a stereo pair (S072). Next, the reference point setting section 42 searches a point matching a feature point having a retro-target applied and located near the point indicated with the corresponding point indicating section 45 on one of the stereo images (reference image), and sets the point matching the feature point as the reference point (S074). The corresponding point searching section 43 determines a corresponding point, corresponding to the reference point, on the other (searched image) of the stereo images (S076). Thus, also for the retro-target, reference point and corresponding point are determined and orientation is made possible.

Next, the orienting section 44 performs orienting process (S080). The model image forming and storing section 48 forms a model image (S085). Next, the image correlating and orienting section 40 determines a matching area and stereo measurement is performed using the functions of the reference point setting section 42, the corresponding point searching section 43, and the corresponding point indicating section 45 (S087) in the matching area. For the stereo measurement, for example a correlation factor method is used to perform image correlating process. Thus, three-dimensional measurement is made possible also for the retro-target to determine three-dimensional coordinates of the measured object 1 (S090). In this case too, positional coordinates of the retro-target may be determined on the basis of the positional coordinates of the color-coded target. This makes it possible to obtain more detailed three-dimensional measurements. Alternatively, it is possible to determine three-dimensional coordinates of main points with the color-coded target CT, followed by detailed three-dimensional measurement using the retro-target and the coordinate data of main points. Otherwise the process flow is similar to that of the first embodiment.

While embodiments of the invention are described above, the invention is not limited to the above embodiments. Rather, it is apparent that various modifications may be added to the embodiments.

For example, while the above embodiments are described as examples in which the color-coded targets are the color-coded targets for three-dimensional measurements, this invention is not limited to the above example. Rather, this invention may also be applied to targets for discriminating commodities, cargoes, and samples. Moreover, while the above embodiments are described as examples in which the conical model proposed by Maeda and others is used as the HSI conversion model, other models such as hexagonal pyramid model, twin hexagonal pyramid model, etc. may be used. While the above embodiments are also described as examples in which the number n of color codes is 6, 8, 9, etc., the number may be any whole number greater than 1. In that case, adjacent colors are preferably chosen so that hue difference is about 360°/n. While the fifth embodiment is described as an example in which hue difference between adjacent colors on the quasi HSI color space excluding blue-based and magenta-based colors is nearly even, it is also possible to choose that the hue difference between adjacent colors on the quasi HSI color space excluding other partial blue-based and magenta-based colors is nearly even. The above embodiments are also described as examples in which the colors of the color-coded pattern include colors of the reference color pattern, the reference color pattern need not necessarily be included; for example, the hue of the reference pattern may be chosen to be intermediate between the hues of adjacent color-coded patterns. The above embodiments are also described as examples having the color-coded targets in which the external shape of the position detecting pattern P1 is square and the external shape of the unit area of the color code section is square. However, such shapes are not limited to the above but the external shape of at least one of the position detecting pattern P1 and the unit area of the color code section may be rectangular. Furthermore, the unit area of the color code section may be other shape such as bar shape patterns and circle shape patterns. While the color-coded target is described to be square, it may also be of rectangular shape. When each of them is made to be rectangular, it is preferable to make the ratio of vertical to lateral sides to be the same value. It is also possible to change the constitution of the color code extracting device and the flow of extracting the color-coded targets. For example, while the above embodiments are described as examples in which the HSI conversion is made after acquiring photographed images before extracting color-coded targets, the conversion may be made after extracting color-coded targets with the extracting section before determining the discriminating codes with the discriminating code determining section, or after the grouping process before the color code detecting process. It is also possible to make the constant m for margin in the conditional equations (4-1)-(4-6) for determining hue relationship to have different value for each color. It is also possible to appropriately change the reference color, code color, and the number of codes. Also the color code extracting device and the three-dimensional measuring system are not limited to the above embodiments but may be arranged otherwise as long as the HSI converting function, the color code extracting function, and the code discriminating function are provided.

This invention is utilized as a target for three-dimensional measurement.

The use of the terms "a" and "an" and "the" and similar referents in the context of describing the invention (especially in the context of the following claims) is to be construed to cover both the singular and the plural, unless otherwise indicated herein or clearly contradicted by context. The terms "comprising," "having," "including," and "containing" are to be construed as open-ended terms (i.e., meaning "including, but not limited to,") unless otherwise noted. Recitation of ranges of values herein are merely intended to serve as a shorthand method of referring individually to each separate value falling within the range, unless otherwise indicated herein, and each separate value is incorporated into the specification as if it were individually recited herein. All methods described herein can be performed in any suitable order unless otherwise indicated herein or otherwise clearly contradicted by context. The use of any and all examples, or exemplary language (e.g., "such as") provided herein, is intended merely to better illuminate the invention and does not pose a limitation on the scope of the invention unless otherwise claimed. No language in the specification should be construed as indicating any non-claimed element as essential to the practice of the invention.

Preferred embodiments of this invention are described herein, including the best mode known to the inventors for carrying out the invention. Variations of those preferred embodiments may become apparent to those of ordinary skill in the art upon reading the foregoing description. The inventors expect skilled artisans to employ such variations as appropriate, and the inventors intend for the invention to be practiced otherwise than as specifically described herein. Accordingly, this invention includes all modifications and equivalents of the subject matter recited in the claims appended hereto as permitted by applicable law. Moreover, any combination of the above-described elements in all possible variations thereof is encompassed by the invention unless otherwise indicated herein or otherwise clearly contradicted by context.

DESCRIPTION OF REFERENCE NUMERALS AND SYMBOLS 1 measured object
10 image photographing device
12 projector
13 image data storing section
30 HSI converting section
31 HSI image data storing section
40 image correlating and orienting section
41 extracting section
42 reference point setting section
43 corresponding point searching section
44 orienting section
45 corresponding point indicating section
46 discriminating code determining section
47 disposing section
48 model image forming and storing section
49 target pattern processing section
50 three-dimensional position measuring section
51 three-dimensional coordinate data operating section
53 three-dimensional coordinate data storing section
54 stereoscopic two-dimensional image forming section
57 stereoscopic two-dimensional image displaying section
60 displaying device
100 color code extracting section
110 retro-target detecting process section
120 retro-target grouping process section
130 color code detecting process section
131 color-coded target area and direction detecting process section
140 image and color pattern storing section
141 target position and color disposition storing section
142 color-coded target correspondence table
143 HSI image data storing section
150 target information storing section
200 retro-target
204 inner circle
206 outer circle
311 color detecting process section
312 color correcting section
321 hue relation determining section
322 code converting process section
491 pattern detecting section
492 pattern forming section
493 pattern projecting section
500, 500A, 500B three-dimensional measuring system
CT, CT1-CT6 color-coded target
H hue
I intensity
P1 pattern for position detection (retro-target section)

P2 reference color pattern (color code section)
P3 color code pattern (color code section)
P4 spare pattern (spare section)
P5 separation area
S saturation
$T_0$ threshold value
t scanning time
θ hue-representing angle

What is claimed is:

1. A color-coded target comprising, on a surface thereof:
   a position detecting pattern for indicating a position to be measured;
   a reference color pattern having a unit area tinted in a color for use as a color reference; and
   a color code pattern having a plurality of unit areas tinted in different colors for discriminating said target,
   wherein the different colors of said color code pattern are arranged so that adjacent colors in the HSI color space are different in at least one of hue, saturation, and intensity by a specified value or greater; and
   said reference color pattern is suitable for use for correcting color divergence in said color code pattern.

2. The color-coded target as recited in claim 1 wherein,
   the colors of said color code pattern are changed in at least one of hue, saturation, and intensity as a variable; and
   when hue is a variable, said specified value is expressed by difference in hue,
   when saturation is a variable, said specified value is expressed by difference in saturation, and
   when intensity is a variable, said specified value is expressed by difference in intensity.

3. The color-coded target as recited in claim 1, wherein, said reference color pattern has a plurality of unit areas tinted in different colors for use as color references;
   the colors of said reference color pattern are arranged so that adjacent colors in said HSI color space are different by a nearly even difference in hue, the colors of said color-code pattern include the colors of said reference color pattern, and adjacent colors in said HSI color space are different by a nearly even difference in hue.

4. The color-coded target as recited in claim 1, wherein,
   a quasi HSI color space is formed removing part of hues in said HSI color space, said reference color pattern has a plurality of unit areas tinted in different colors for use as color references;
   the colors of said reference color pattern are arranged so that adjacent colors in said quasi HSI color space are different by a nearly even difference in hue, the colors of said color code pattern include the colors of said reference color pattern, and adjacent colors in said quasi HSI color space are different by a nearly even difference in hue.

5. The color-coded target as recited in claim 1, wherein said color code pattern has unit areas, the unit areas being equal to each other in area and a number of the unit areas being same as a number of said arranged colors, and all the unit areas are different in color.

6. The color-coded target as recited in claim 1, wherein the colors of said color code pattern are configured with three or more colors including the colors of said reference color pattern.

7. The color-coded target as recited in claim 1, wherein a retro-reflective retro-target is used in said position detecting pattern.

8. The color-coded target as recited in claim 1, wherein said color-coded target is formed as a sheet in quadrilateral shape;
   on a top surface of said sheet, said position detecting pattern is disposed, and
   said reference color pattern and said color code pattern are printed; and
   on a back surface of said sheet, adhesive is applied or a magnetic sheet is provided.

9. A color code extracting device comprising:
   an HSI converting section for acquiring HSI image data by converting colors of a photographed image into colors in the HSI color space, said photographed image being obtained by photographing a measured object with a color-coded target attached thereto or projected thereto, said color-coded target having, on a surface thereof, a position detecting pattern for indicating a position to be measured, a reference color pattern having a unit area tinted in a color for use as a color reference, and a color code pattern having a plurality of unit areas tinted in different colors for discriminating said color-coded target;
   an extracting section for extracting color code pattern and position detecting pattern of said color-coded target from said HSI image data; and
   a discriminating code determining section for determining, from the color code pattern of said color-coded target extracted with said extracting section, discriminating code of said color-coded target using hues in the HSI color space.

10. A three-dimensional measuring system comprising:
    said color code extracting device as recited in claim 9;
    an image photographing device for taking images of the measured object from at least two directions so as to include said color-coded target; and
    a three-dimensional measuring section for measuring three-dimensional coordinates of the measured object based on a discriminating code and position coordinates of said color-coded target extracted with said color code extracting device;
    wherein said taken images are expressed with colors in an RGB color space, and said HSI converting section converts colors of the taken images from colors in the RGB color space into colors in the HSI color space.

* * * * *